US010556571B2

(12) United States Patent
Kubota et al.

(10) Patent No.: US 10,556,571 B2
(45) Date of Patent: Feb. 11, 2020

(54) FOREIGN MATTER REMOVAL DEVICE AND VEHICLE EQUIPPED WITH FOREIGN MATTER REMOVAL DEVICE

(71) Applicant: KOITO MANUFACTURING CO., LTD., Tokyo (JP)

(72) Inventors: Akinobu Kubota, Shizuoka (JP); Junji Baba, Shizuoka (JP); Yasuhiro Ichikawa, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 95 days.

(21) Appl. No.: 15/740,936

(22) PCT Filed: Jun. 22, 2016

(86) PCT No.: PCT/JP2016/068573
§ 371 (c)(1),
(2) Date: Dec. 29, 2017

(87) PCT Pub. No.: WO2017/002688
PCT Pub. Date: Jan. 5, 2017

(65) Prior Publication Data
US 2018/0194331 A1    Jul. 12, 2018

(30) Foreign Application Priority Data

Jun. 30, 2015 (JP) .................... 2015-131781
Jun. 30, 2015 (JP) .................... 2015-131782

(51) Int. Cl.
B60S 1/62    (2006.01)
B05B 9/04    (2006.01)
(Continued)

(52) U.S. Cl.
CPC .............. B60S 1/62 (2013.01); B05B 9/0413 (2013.01); B60R 11/04 (2013.01); F04B 35/01 (2013.01);
(Continued)

(58) Field of Classification Search
CPC ..... B60S 1/62; B60S 1/54; B60S 1/56; H04N 5/2171; H04N 7/18; H04N 5/225;
(Continued)

(56) References Cited

U.S. PATENT DOCUMENTS 5,546,630 A    8/1996 Long
2009/0250533 A1    10/2009 Akiyama et al.
(Continued)

FOREIGN PATENT DOCUMENTS

CN    2298172 Y    11/1998
CN    103043035 A    4/2013
(Continued)

OTHER PUBLICATIONS

Int. Search Report dated Aug. 23, 2016 issued by the Int. Searching Authority in corresponding Application No. PCT/JP2016/068573 (PCT/ISA/210).
(Continued)

Primary Examiner — David Redding
(74) Attorney, Agent, or Firm — Sughrue Mion, PLLC

(57) ABSTRACT

A foreign matter removal device of the present invention includes a high-pressure air generation unit (5) that includes a generation unit having a drive source and configured to generate high-pressure air using the drive source, and a housing (51) covering the generation unit, and a plate-shaped adhesive member (71) that includes an adhesion layer (71B) elastically deformable along at least a part of a surface shape of a back door panel (200a) constituting the vehicle. The housing (51) is attached to the back door panel
(Continued)

(200a) via the adhesive member (71) in surface contact with the back door panel (200a).

26 Claims, 17 Drawing Sheets

(51) Int. Cl.
| | | |
|---|---|---|
| *B60R 11/04* | (2006.01) | |
| *F04B 35/01* | (2006.01) | |
| *H04N 5/217* | (2011.01) | |
| *B60S 1/54* | (2006.01) | |
| *B60R 11/00* | (2006.01) | |
| *H04N 7/18* | (2006.01) | |

(52) U.S. Cl.
CPC ............ *H04N 5/2171* (2013.01); *H04N 7/18* (2013.01); *B60R 2011/004* (2013.01); *B60S 1/54* (2013.01)

(58) Field of Classification Search
CPC ......... F04B 35/01; B05B 9/0413; B60R 1/00; B60R 11/04; B60R 2011/004
See application file for complete search history.

(56) References Cited

U.S. PATENT DOCUMENTS

| | | |
|---|---|---|
| 2011/0073142 A1 | 3/2011 | Hattori et al. |
| 2012/0117745 A1 | 5/2012 | Hattori et al. |
| 2013/0092758 A1 | 4/2013 | Tanaka et al. |
| 2014/0104426 A1 | 4/2014 | Boegel et al. |
| 2015/0114431 A1 | 4/2015 | Manning, Jr. |
| 2015/0353024 A1 | 12/2015 | Cooper |
| 2017/0028968 A1 | 2/2017 | Kubota et al. |

FOREIGN PATENT DOCUMENTS

| | | |
|---|---|---|
| EP | 1 616 762 A2 | 1/2006 |
| EP | 2949520 A1 | 12/2015 |
| JP | 3-102652 A | 4/1991 |
| JP | 11255018 A | 9/1999 |
| JP | 2001-171491 A | 6/2001 |
| JP | 2009-83730 A | 4/2009 |
| JP | 2009-248661 A | 10/2009 |
| JP | 2011-240910 A | 12/2011 |
| JP | 2012-201122 A | 10/2012 |
| JP | 2015-104933 A | 6/2015 |
| WO | 2015/159763 A1 | 10/2015 |

OTHER PUBLICATIONS

Written Opinion dated Aug. 23, 2016 issued by the Int. Searching Authority in corresponding Application No. PCT/JP2016/068573 (PCT/ISA/237).
Communication dated Feb. 22, 2019, issued by the European Patent Office in counterpart European Patent Application No. 16817796.2.
Communication dated Nov. 21, 2019 from the National Intellectual Property Administration of the People's Republic of China in application No. 201680038229.1.

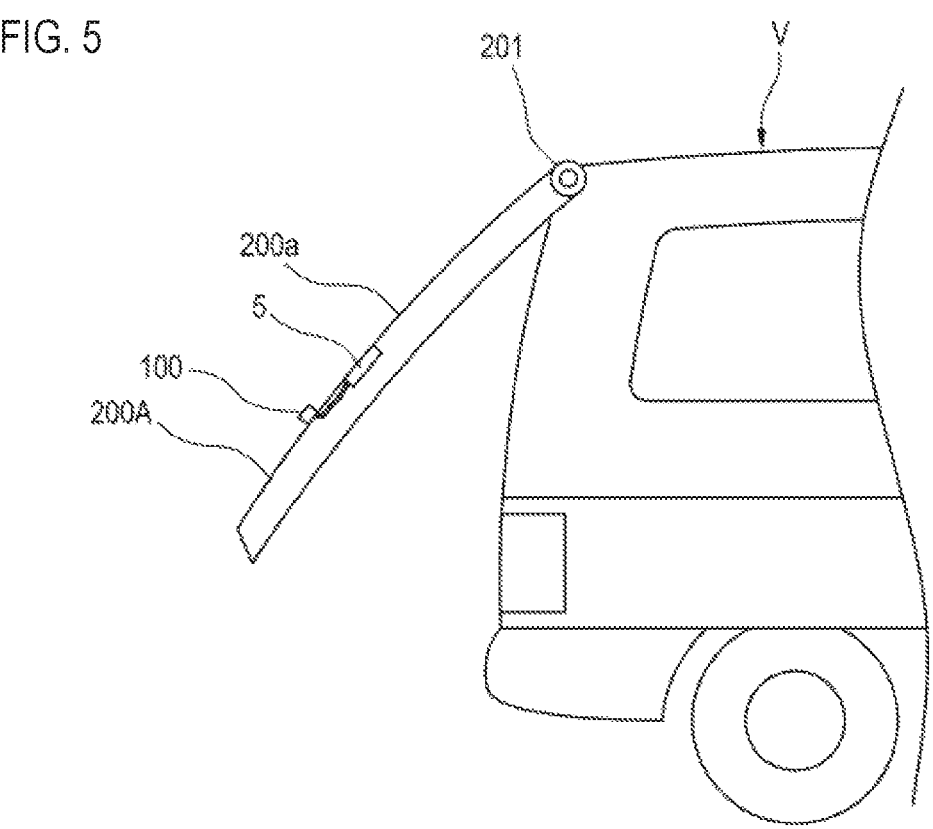

FOREIGN MATTER REMOVAL DEVICE AND VEHICLE EQUIPPED WITH FOREIGN MATTER REMOVAL DEVICE

TECHNICAL FIELD

The present invention relates to a device for removing foreign matters by injecting high-pressure air.

BACKGROUND ART

Recently, the number of vehicles equipped with in-vehicle cameras for photographing the situations around the vehicle is increasing. In the in-vehicle cameras, there is a case that a lens as an imaging surface becomes dirty due to rain, mud or the like. Therefore, conventionally, a foreign matter removal device for removing foreign matters by blowing high-pressure air or the like to the lens of the in-vehicle camera in order to remove foreign matters such as water droplets adhering on the lens has been known (see Patent Document 1).

CITATION LIST

Patent Document
Patent Document 1: Japanese Patent Laid-Open Publication No. 2001-171491

DISCLOSURE OF INVENTION

Problems to be Solved by Invention

In the device disclosed in Patent Document 1, high-pressure air generated by a high-pressure air generation unit (referred to as "high-pressure air generating unit in Patent Document 1) is injected toward a lens to blow away foreign matters such as mud and water droplets. The high-pressure air generation unit for generating the high-pressure air is installed at any place of a vehicle. However Patent Document 1 does not specifically disclose a configuration for attaching the high-pressure air generation unit.

Accordingly, the present inventors have tried a configuration in which a high-pressure air generation unit is attached on a panel constituting a back door or the like of a vehicle, for example. However, in an existing vehicle, the shape of the panel of the vehicle varies depending on the type of the vehicle. Therefore, it has been found that an area for mounting the high-pressure air generation unit on the panel may not be secured and the versatility at the time of attaching the high-pressure air generation unit on the vehicle is lowered.

One object of the present invention is to provide a foreign matter removal device capable of enhancing the versatility at the time of attaching the high-pressure air generation unit, and a vehicle provided with the foreign matter removal device.

Further, as a result of prototyping, the present inventors have found that the sound and vibration due to the operation of a drive source such as a motor mounted inside a housing of a high-pressure air generation unit may become abnormal noise by being resonated by a panel.

Another object of the present invention is to provide a foreign matter removal device capable of suppressing the occurrence of abnormal noise due to the operation of the drive source of the high-pressure air generation unit, and a vehicle provided with the foreign matter removal device.

Means for Solving the Problems

In order to achieve one of the above objects, a foreign matter removal device of the present invention removes foreign matters on a lens of an in-vehicle camera attached to a vehicle so that the lens of the in-vehicle camera is exposed toward the outside of a body panel of a vehicle, the foreign matter removal device comprising:

a high-pressure air generation unit that includes a generation unit having a drive source and configured to generate high-pressure air using the drive source, and a housing covering the generation unit; and a plate-shaped adhesive member that includes an adhesion layer elastically deformable along at least a part of a surface shape of a panel member constituting the vehicle, wherein the housing is attached to the panel member via the adhesive member in surface contact with the panel member.

According to this configuration, the housing of the high-pressure air generation unit is attached to the panel member constituting the vehicle via the plate-shaped adhesive member having the elastically deformable adhesion layer. The adhesion layer of the adhesive member is elastically deformable along the surface shape of the panel member of the vehicle. Even when the panel member has a curved portion or an uneven portion, the adhesion layer is deformed along the curved portion or the uneven portion and makes surface contact therewith. Therefore, a contact area for obtaining an adhesive force required for fixing the housing on the panel member can be secured, so that the versatility at the time of attaching the high-pressure air generation unit can be improved.

Further, in the foreign matter removal device of the present invention, the adhesive member may have an adhesive surface portion on which the adhesion layer is formed, and a mounting portion which is formed continuously with the adhesive surface portion and on which the housing can be mounted, and a gap may be formed between the adhesive surface portion and the housing in a state in which the housing is mounted on the mounting portion.

According to this configuration, since the gap is formed between the adhesive surface portion and the housing, the deformation of the adhesion layer is less susceptible to the influence of the rigidity of the housing of the high-pressure air generation unit. Therefore, the adhesion surface portion is likely to be deformed along the curved portion or the uneven portion of the panel member, so that the versatility at the time of attaching the high-pressure air generation unit can be further improved.

Further, in the foreign matter removal device of the present invention, the adhesive surface portion may include at least three plate-shaped members separated from each other, and the plate-shaped members may be connected to each other via the mounting portion.

According to this configuration, since the adhesive surface portion includes three separated members, the adhesion surface portion is more easily deformed with respect to the curved portion or the uneven portion of the panel member and is likely to make contact therewith. In this way, the versatility during attachment is further improved.

Further, in the foreign matter removal device of the present invention, the mounting portion may have a connecting portion that connects the housing and the mounting portion, and the connecting portion may be configured to be elastically deformable.

According to this configuration, since the connecting portion can function as a cushioning member, the sound and vibration due to the operation of the drive source are difficult to propagate to the panel member. Therefore, it is possible to suppress the occurrence of abnormal noise due to the operation of the drive source.

Further, in the foreign matter removal device of the present invention, the adhesive member may have an adhesive surface portion on which the adhesion layer is at least partially formed, and a connecting member that connects the adhesive surface portion and the housing, and a gap may be formed between the adhesive surface portion and the housing in a state in which the housing is fixed by the connecting member.

According to this configuration, since the gap is formed between the adhesive surface portion and the housing, the deformation of the adhesion layer is less susceptible to the influence of the rigidity of the housing of the high-pressure air generation unit. Therefore, the adhesion surface portion is likely to be deformed along the curved portion or the uneven portion of the panel member, so that the versatility at the time of attaching the high-pressure air generation unit can be further improved.

Further, in the foreign matter removal device of the present invention, the connecting member may be formed of an elastic material.

According to this configuration, since the connecting member can function as a cushioning member, the sound and vibration due to the operation of the drive source are difficult to propagate to the panel member. Therefore, it is possible to suppress the occurrence of abnormal noise due to the operation of the drive source.

Further, in the foreign matter removal device of the present invention, the adhesive surface portion may have a flange portion that can be bent and deformed.

According to this configuration, since the adhesive surface portion is easily brought into contact with the panel member by being deformed following the curved portion or the uneven portion of the panel member, the versatility during attachment is further improved.

Further, in the foreign matter removal device of the present invention, the in-vehicle camera and the high-pressure air generation unit may be attached to the panel member.

According to this configuration, the pipeline length of a hose or the like for delivering the high-pressure air generated by the high-pressure air generation unit can be shortened, and the versatility at the time of attaching the high-pressure air generation unit can be further improved, as compared with a configuration in which the in-vehicle camera and the high-pressure air generation unit are attached to different members.

Further, in the foreign matter removal device of the present invention, the panel member may be a back door panel constituting an outer surface of a back door of the vehicle, the in-vehicle camera may be attached to the back door panel, and the high-pressure air generation unit may be disposed at a position closer to a hinge mechanism of the back door panel than the in-vehicle camera.

According to this configuration, an impact force applied to the high-pressure air generation unit at the time of opening and closing the back door is small and a contact area for obtaining an adhesive force required for fixing the housing on the panel member can be reduced, as compared with a configuration in which the high-pressure air generation unit is disposed at a position farther from the hinge mechanism of the back door panel than the in-vehicle camera. Therefore, it is possible to further improve the versatility at the time of attaching the high-pressure air generation unit.

Further, in the foreign matter removal device of the present invention, the housing may have a first surface facing the panel member and a second surface on which a connector part that supplies power to the drive source is formed, and the second surface may be provided as a surface different from the first surface.

According to this configuration, since the second surface on which the connector part is formed does not face the panel member of the vehicle, it is easy to attach the housing of the high-pressure air generation unit to the panel member of the vehicle and it is also easy to secure a wiring for power supply. In this way, the versatility at the time of attaching the high-pressure air generation unit can be further improved.

Further, in the foreign matter removal device of the present invention, the generation unit may have a piston and an elastic member, and the generation unit may generate the high-pressure air by storing an elastic force of the elastic member by using the drive source and releasing the elastic force to move the piston at a high speed.

According to this configuration, the high-pressure air generation unit can be reduced in size and weight, so that the versatility at the time of attaching the high-pressure air generation unit is further improved.

Further, in the foreign matter removal device of the present invention, the generation unit may continuously generate the high-pressure air by repeatedly moving the piston at a high speed by using the drive source and the elastic member.

According to this configuration, the performance of removing foreign matters from the lens can be improved.

Further, in the foreign matter removal device of the present invention, a movement direction of the piston when generating the high-pressure air may be parallel to the surface where the adhesive member makes surface contact with the panel member.

According to this configuration, most of the reaction force applied to the housing when the piston is moved at a high speed is parallel to the surface (contact surface) where the adhesive member makes surface contact with the panel member, and the component of the reaction force in the direction intersecting with the contact surface is relatively small. Therefore, for example, even when the piston is continuously moved at a high speed and the reaction force at that time is continuously applied to the housing, the adhesive member is prevented from being detached from the panel member because the force of the component in the direction in which the adhesive member is detached from the panel member is small.

Further, a foreign matter removal device of the present invention removes foreign matters on a lens, the foreign matter removal device comprising:

a high-pressure air generation unit that includes a generation unit having a drive source and configured to generate high-pressure air using the drive source, and a housing covering the generation unit; and a plate-shaped adhesive member that includes an adhesion layer elastically deformable along at least a part of a surface shape of a panel member, wherein the housing is fixed to the panel member via the adhesive member in surface contact with the panel member.

According to this configuration, the housing of the high-pressure air generation unit is attached to the panel member via the plate-shaped adhesive member having the elastically deformable adhesion layer. The adhesion layer of the adhesive member is elastically deformable along the surface shape of the panel member. Even when the panel member has a curved portion or an uneven portion, the adhesion layer is deformed along the curved portion or the uneven portion and makes surface contact therewith. Therefore, a contact area for obtaining an adhesive force required for fixing the housing on the panel member can be secured, so that the versatility at the time of attaching the high-pressure air generation unit can be improved.

Further, a vehicle of the present invention comprises the foreign matter removal device described above.

According to this configuration, for example, even when a lens of an in-vehicle camera becomes dirty due to rain, mud or the like, foreign matters on the lens can be removed by blowing high-pressure air thereto, thereby enhancing the accuracy of information obtained from the in-vehicle camera.

Further, in order to achieve one of the above objects, a foreign matter removal device of the present invention removes foreign matters on a lens of an in-vehicle camera attached to a vehicle so that the lens of the in-vehicle camera is exposed toward the outside of a body panel of a vehicle, the foreign matter removal device comprising:

a high-pressure air generation unit that includes a generation unit having a drive source and configured to generate high-pressure air using the drive source, and a housing covering the generation unit, a plate-shaped fixing member fixed to a panel member constituting a vehicle; and a connecting member that connects the fixing member and the high-pressure air generation unit and is capable of absorbing vibration, wherein a gap is formed between the fixing member and the housing in a state in which the fixing member is fixed to the panel member and the housing is connected to the connecting member.

According to this configuration, the high-pressure air generation unit is attached to the panel member of the vehicle by the connecting member and the fixing member in a state in which the gap is formed between the panel member and the high-pressure air generation unit. Therefore, the sound and vibration due to the operation of the drive source of the high-pressure air generation unit are reduced by the connecting member capable of absorbing the vibration and are difficult to propagate to the panel member of the vehicle. In this way, according to the above configuration, the sound and vibration due to the operation of the drive source of the high-pressure air generation unit are prevented from being resonated by the panel member, and hence, the occurrence of abnormal noise can be suppressed.

Further, in the foreign matter removal device of the present invention, the fixing member may be fixed to the panel member via an adhesive member having an elastically deformable adhesion layer.

According to this configuration, the plate-shaped adhesive member including the elastically deformable adhesion layer can also function as a cushioning member. Therefore, according to the above configuration, the sound and vibration due to the operation of the drive source can be also buffered by the adhesive member, so that the sound and vibration are further difficult to propagate to the panel member. In this way, the occurrence of abnormal noise due to the operation of the drive source is further suppressed.

Further, in the foreign matter removal device of the present invention, the connecting member may include a plurality of elastic members.

According to this configuration, each of the elastic members can disperse and reduce the sound and vibration due to the operation of the drive source. Further, even when an impact is applied to the housing of the high-pressure air generation unit due to, for example, an external factor such as when opening and closing the back door, each of the elastic members can disperse and reduce the impact.

Further, in the foreign matter removal device of the present invention, the fixing member may have a flange portion that can be bent and deformed.

According to this configuration, since the fixing member is easily brought into contact with the panel member by being deformed following the curved portion or the uneven portion of the panel member, the versatility during attachment is further improved.

Further, in the foreign matter removal device of the present invention, the fixing member and the connecting member may be integrally formed of the same material.

According to this configuration, the number of parts can be reduced and the cost can be reduced.

Further, in the foreign matter removal device of the present invention, the fixing member may include a plurality of plate-shaped members separated from each other, and the plate-shaped members may be connected to each other via the connecting member.

According to this configuration, even when an impact is applied to the housing of the high-pressure air generation unit due to, for example, an external factor such as when opening and closing the back door, each of the plate-shaped members can disperse and reduce the impact.

Further, in the foreign matter removal device of the present invention, the panel member may be a back door panel constituting an outer surface of a back door of the vehicle, the in-vehicle camera may be attached to the back door panel, and the high-pressure air generation unit may be disposed at a position closer to a hinge mechanism of the back door panel than the in-vehicle camera.

According to this configuration, an impact force applied to the high-pressure air generation unit at the time of opening and closing the back door can be suppressed to a low level, as compared with a configuration in which the high-pressure air generation unit is disposed at a position farther from the hinge mechanism of the back door panel than the in-vehicle camera.

Further, in the foreign matter removal device of the present invention, the generation unit may have a piston and an elastic member, and the generation unit may generate the high-pressure air by storing an elastic force of the elastic member by using the drive source and releasing the elastic force to move the piston at a high speed.

According to this configuration, the high-pressure air generation unit can be reduced in size and weight, and the sound and vibration due to the operation of the drive source can be reduced.

Further, in the foreign matter removal device of the present invention, the generation unit may continuously generate the high-pressure air by repeatedly moving the piston at a high speed by using the drive source and the elastic member.

According to this configuration, the performance of removing foreign matters from the lens can be improved.

Further, in the foreign matter removal device of the present invention, a movement direction of the piston when generating the high-pressure air may be parallel to the surface where the fixing member makes surface contact with the panel member.

According to this configuration, most of the reaction force applied to the housing when the piston is moved at a high speed is parallel to the surface (attaching surface) where the fixing member is attached to the panel member, and the component of the reaction force in the direction intersecting with the attaching surface is relatively small. Therefore, for example, even when the piston is continuously moved at a high speed and the reaction force at that time is continuously applied to the housing, the sound and vibration due to the high speed movement of the piston are prevented from being resonated by the panel member and the occurrence of abnormal noise can be suppressed because the force of the component in the direction toward the panel member of the vehicle is small.

Further, a foreign matter removal device of the present invention removes foreign matters on a lens, the foreign matter removal device comprising:

a high-pressure air generation unit that includes a generation unit having a drive source and configured to generate high-pressure air using the drive source, and a housing covering the generation unit, a plate-shaped fixing member fixed to a panel member; and a connecting member that connects the fixing member and the high-pressure air generation unit and is capable of absorbing vibration, wherein a gap is formed between the fixing member and the housing in a state in which the fixing member is fixed to the panel member and the housing is connected to the connecting member.

According to this configuration, the high-pressure air generation unit is attached to the panel member by the connecting member and the fixing member in a state in which the gap is formed between the panel member and the high-pressure air generation unit. Therefore, the sound and vibration due to the operation of the drive source of the high-pressure air generation unit are reduced by the connecting member capable of absorbing the vibration and are difficult to propagate to the panel member. In this way, according to the above configuration, the sound and vibration due to the operation of the drive source of the high-pressure air generation unit are prevented from being resonated by the panel member, and hence, the occurrence of abnormal noise can be suppressed.

Further, a vehicle of the present invention comprises the foreign matter removal device described above.

According to this configuration, for example, even when a lens of an in-vehicle camera becomes dirty due to rain, mud or the like, foreign matters on the lens can be removed by blowing high-pressure air thereto, thereby enhancing the accuracy of information obtained from the in-vehicle camera.

Effects of Invention

According to the foreign matter removal device and the vehicle equipped with the foreign matter removal device of the present invention, it is possible to improve the versatility at the time of attaching the high-pressure air generation unit.

Further, according to the foreign matter removal device and the vehicle equipped with the foreign matter removal device of the present invention, it is possible to suppress the occurrence of abnormal noise due to the operation of the drive source of the high-pressure air generation unit.

BRIEF DESCRIPTION OF DRAWINGS

FIG. 5 is a view for explaining the attachment position of the high-pressure air generation unit.

FIG. 6A shows the high-pressure air generation unit mounted on the adhesive member, and FIG. 6B is a plan view of FIG. 6A.

EMBODIMENT FOR CARRYING OUT INVENTION

Hereinafter, an example of an embodiment according to the present invention will be described in detail with reference to the drawings.

For example, a foreign matter removal device of the present invention is applied as a device for removing foreign matters such as water droplets, mud and dust adhering to a lens of an in-vehicle camera.

First Embodiment

Figure 1A:
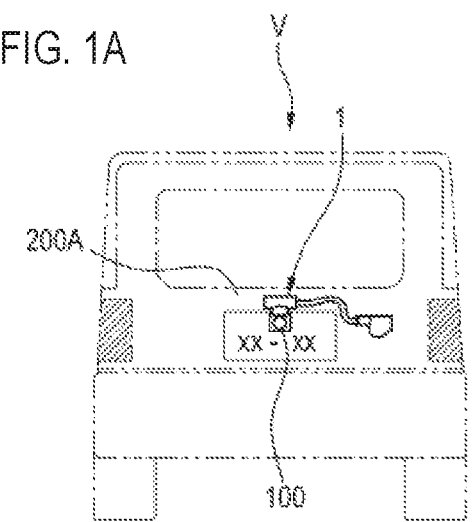
FIG. 1A is a rear view (a foreign matter removal device is shown in a perspective view) of a vehicle.
Figure 1B:
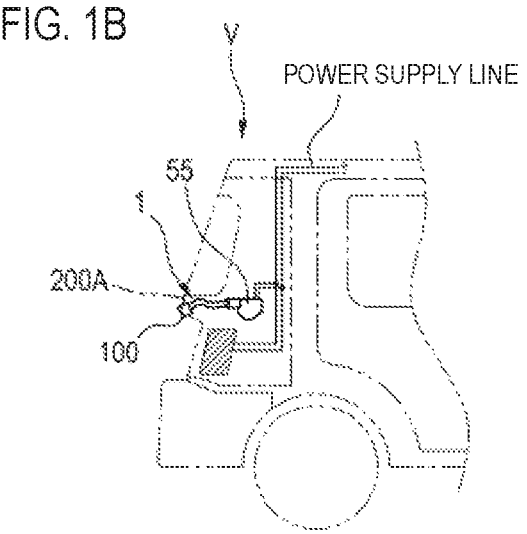
FIG. 1B is a side view (the foreign matter removal device is shown in a perspective view) of a rear part of the vehicle.

As shown in FIGS. 1A and 1B, a foreign matter removal device 1 is attached to a back door 200A of a vehicle V, for example. The foreign matter removal device 1 is provided with a motor 55, and a power supply terminal of the motor 55 is connected to a power supply line of a vehicle. For example, with the triggering that a gear of the vehicle V enters a reverse mode, a vehicle control unit (ECU; not shown) causes an in-vehicle camera 100 (to be described later) to start photographing, and the foreign matter removal device 1 is controlled to operate by the vehicle control unit (ECU) within several seconds at the start of photographing, for example.

Figure 1C:
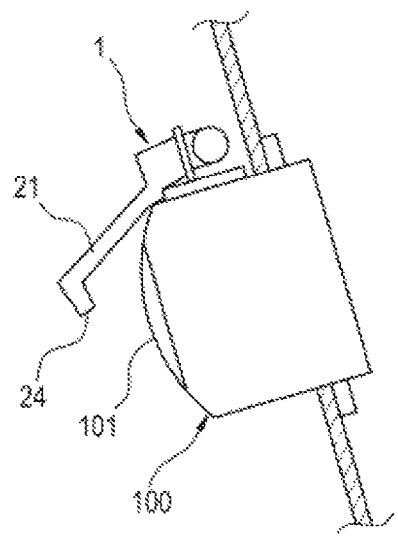
FIG. 1C is a partial enlarged view of the rear part of the vehicle.

The in-vehicle camera 100 is a camera for confirming, for example, the rear side of the vehicle V and, as shown in FIG. 1C, a lens 101 of the in-vehicle camera 100 is attached to the back door 200A so that it is exposed toward the outside of the back door 200A of the vehicle V. The in-vehicle camera 100 is provided with an imaging unit (not shown), and the lens 101 covers the imaging unit. As the lens, a simple translucent cover that does not converge or diffuse light is also included in the lens of this example.

Figure 2A:
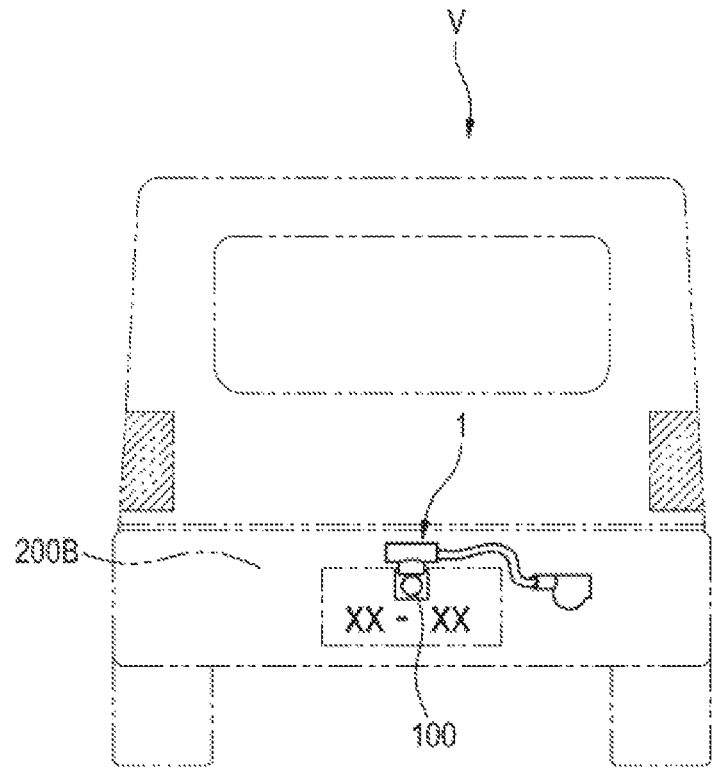
FIGS. 2A and 2B are views showing another example of a position where the foreign matter removal device is attached.
Figure 2B:
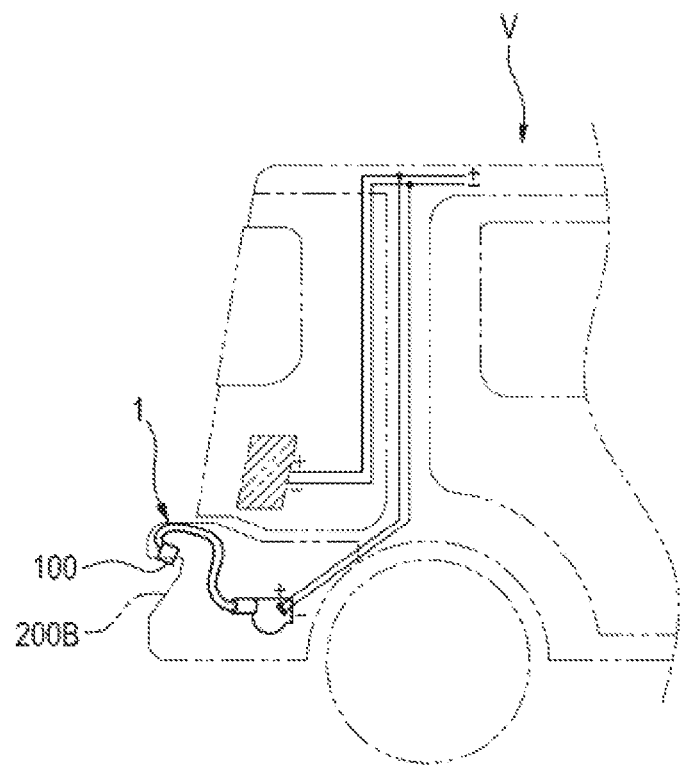

Meanwhile, as shown in FIGS. 2A and 2B, the foreign matter removal device 1 may be attached to a rear bumper 200B of the vehicle V, for example. Meanwhile, the position at which the in-vehicle camera 100 is attached is not limited to the rear end side of the vehicle but may be a body panel such as the front side or lateral side of the vehicle. Further, in this example, the meaning of the phrase, "to be attached to the body panel," includes, for example, a case where the in-vehicle camera is attached via a vehicle mounted component such as a lamp, a door knob, a mirror, a bumper attached to the body panel and a case where the in-vehicle camera is mounted as a part (as an integral body) of these components.

Figure 3:
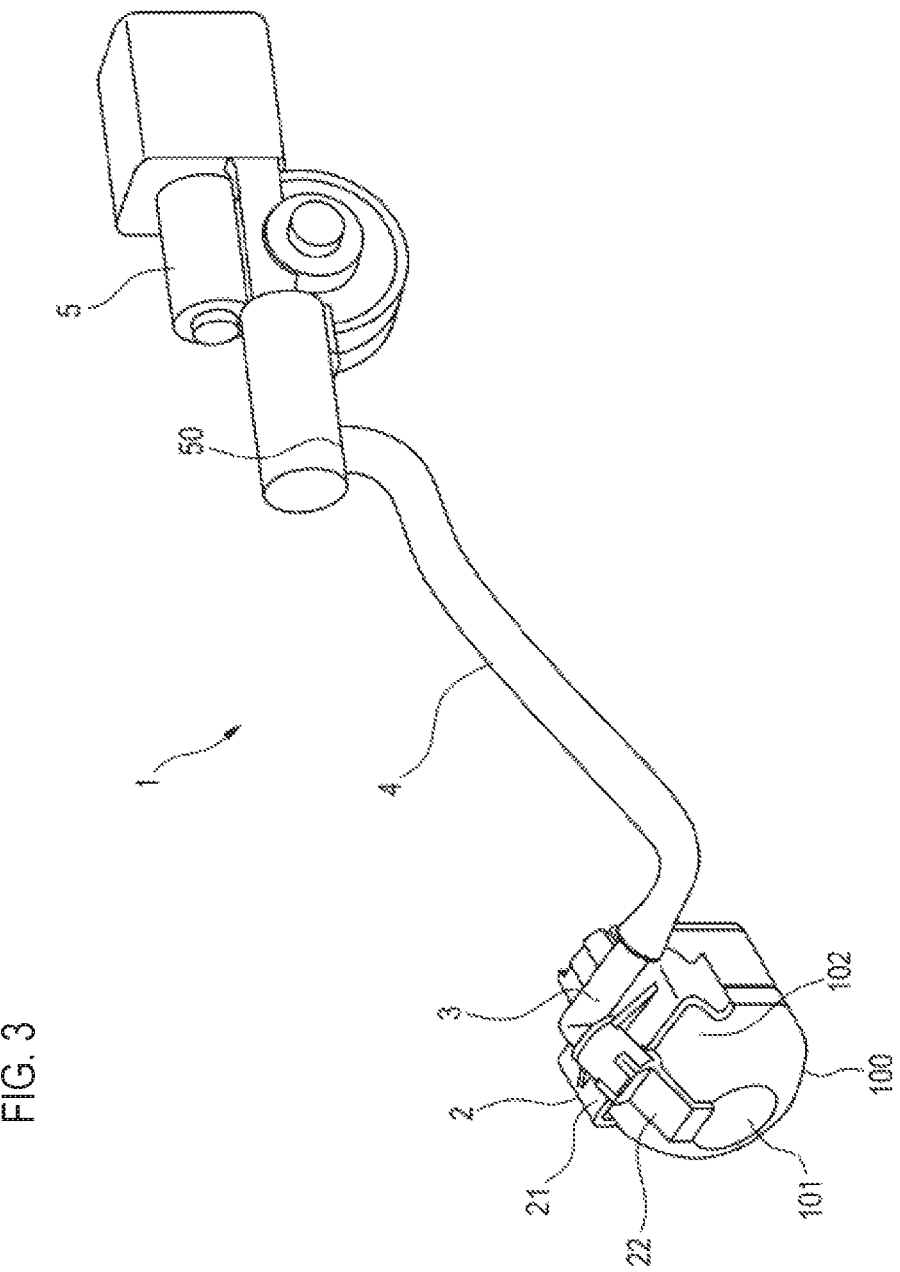
FIG. 3 is a perspective view of a foreign matter removal device according to a first embodiment of the present invention.

As shown in FIG. 3, the foreign matter removal device 1 includes a nozzle unit 2, a joint member 3, a hose 4, and a high-pressure air generation unit 5.

The nozzle unit 2 is configured to be removably attached to the in-vehicle camera 100. The nozzle unit 2 includes an attachment part 21 and a nozzle 22. The nozzle unit 2 is formed of resin material, for example.

The attachment part 21 is attached to a housing 102 of the in-vehicle camera 100 so as to cover a top surface of the in-vehicle camera 100. The nozzle 22 injects high-pressure air toward a lens 101 of the in-vehicle camera 100. The nozzle 22 is formed integrally with the attachment part 21. The nozzle 22 is provided in such a way that a tip end of the nozzle 22 faces the lens 101 when the attachment part 21 is attached to the housing 102. Here, the phrase, "formed integrally with," means that an operator can handle the nozzle 22 and the attachment part 21 as an integral part during assembly work. Specifically, for example, the nozzle 22 and the attachment part 21 may be molded of the same material and in the same mold. Alternatively, the nozzle 22 and the attachment part 21 may be respectively molded of separate materials, and then, fitted together and formed integrally, thereby constituting the nozzle unit 2.

The joint member 3 is a member for joining the nozzle 22 of the nozzle unit 2 and the hose 4. One end portion of the joint member 3 is connected to the nozzle 22 and the opposite end portion thereof is connected to the hose 4. The joint member 3 is formed of resin material, for example.

The hose 4 is a piping member that connects, together with the joint member 3, the nozzle 22 and a high-pressure air generation unit 5. One end portion of the hose 4 is connected to the joint member 3 and the opposite end portion thereof is connected to a discharge port 50 of the high-pressure air generation unit 5. The hose 4 is formed of, for example, a material such as resin or rubber.

The high-pressure air generation unit 5 is a unit for generating high-pressure air to be fed to the nozzle 22. The high-pressure air generation unit 5 is attached to a part of a vehicle body at the inside of a vehicle.

Figure 4:
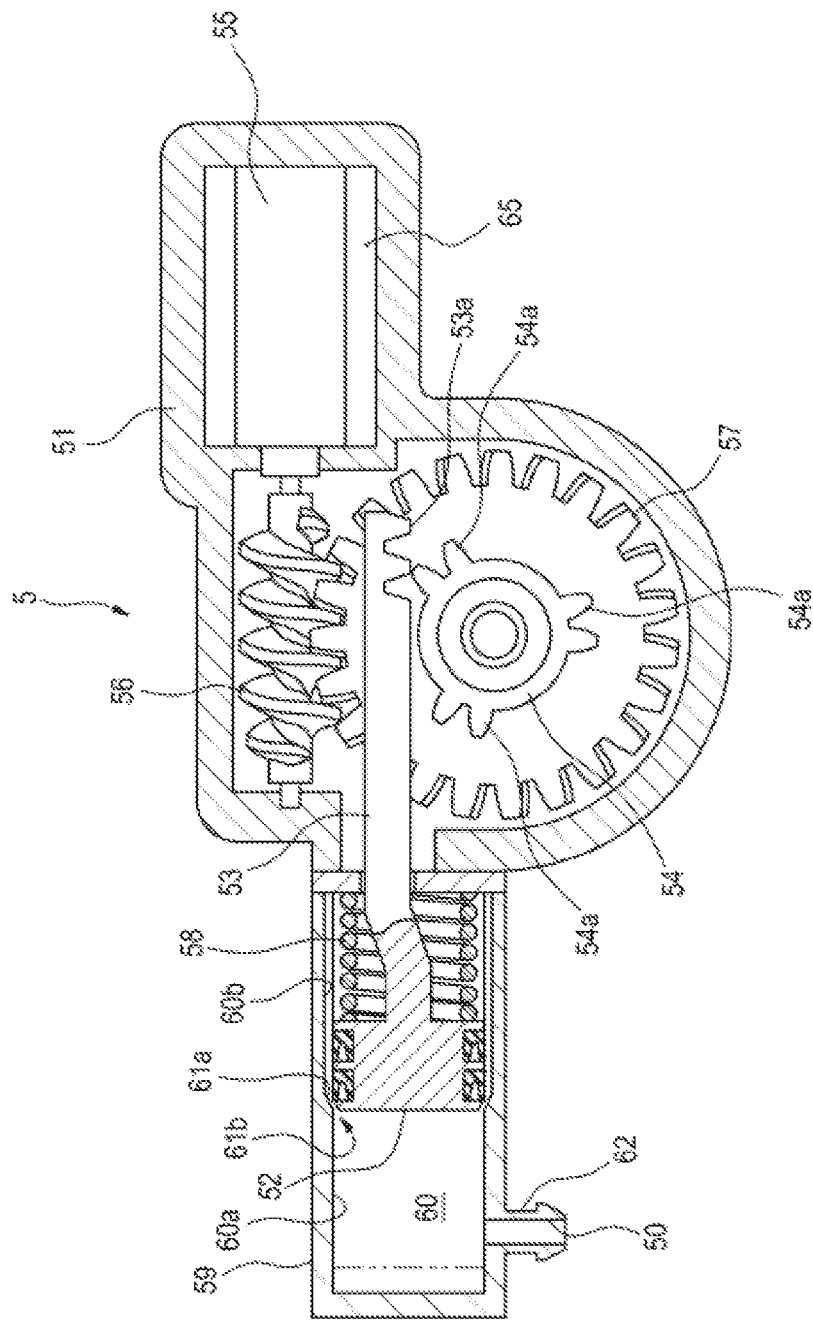
FIG. 4 is a configuration view of a high-pressure air generation unit included in the foreign matter removal device.

As shown in FIG. 4, the high-pressure air generation unit 5 includes a housing (case main body) 51 and a moving mechanism (generation unit) 65 disposed inside the housing 51. The moving mechanism 65 generates high-pressure air. Of a moving direction of a piston 52 in the high-pressure air generation unit 5, a rearward direction that is a direction of feeding out air refers to a feeding direction, and a forward direction that is opposite to the feeding direction refers to a force accumulation direction.

In an initial state before high-pressure air is fed out, the piston 52 is positioned on the feeding direction side, and a rack 53 is positioned in a state where a rack portion 53a is engageable with a gear portion 54a of a pinion 54.

When the driving of the motor (driving source) 55 is started and a driving force of the motor 55 is transmitted to a worm wheel 57 via a worm 56, the gear portion 54a of the pinion 54 is meshed with the rack portion 53a of the rack 53. Therefore, the rack 53 moves in the force accumulation direction against an urging force of an urging spring (elastic member) 58 in accordance with the rotation of the pinion 54. As the rack 53 moves in the force accumulation direction, the meshing between the gear portion 54a and the rack portion 53a is released at a predetermined position. The position (position shown in FIG. 4) where the meshing between the gear portion 54a and the rack portion 53a is released is set as the bottom dead center of the piston 52. In a state in which the piston 52 is positioned at the bottom dead center, the air (outside air) flowing into a substantially front half portion (second space) 60b of an internal space 60 of a piston support portion 59 passes through a gap 61b along a step 61a and flows toward a substantially rear half portion (first space) 60a of the internal space 60.

When the piston 52 is moved to the bottom dead center, the meshing between the gear portion 54a and the rack portion 53a is released, and the piston 52 is moved in the feeding direction at a speed higher than the moving speed in the force accumulation direction by an urging force of the urging spring 58. In this way, the air flowing from the second space 60b to the first space 60a passes through the discharge port 50 of a connection protrusion 62 from the first space 60a and is fed toward the nozzle 22 of the nozzle unit 2 via the hose 4. At this time, since the diameter of the discharge port 50 is smaller than that of the piston support portion 59, the air discharged from the first space 60a through the discharge port 50 is compressed into high-pressure air and is fed out. The moving mechanism 65 repeatedly moves the piston 52 at a high speed to continuously generate high-pressure air.

As shown in FIG. 5, the in-vehicle camera 100 and the high-pressure air generation unit 5 are fixed to a back door panel (an example of the panel member) 200a constituting an outer surface of the back door 200A of the vehicle V, for example. In this example, the in-vehicle camera 100 is disposed outside the back door 200A, and the high-pressure air generation unit 5 is disposed inside an outer panel of the back door 200A. The high-pressure air generation unit 5 is disposed at a position closer to a hinge mechanism 201 of the back door 200A than the in-vehicle camera 100.

Figure 6A:
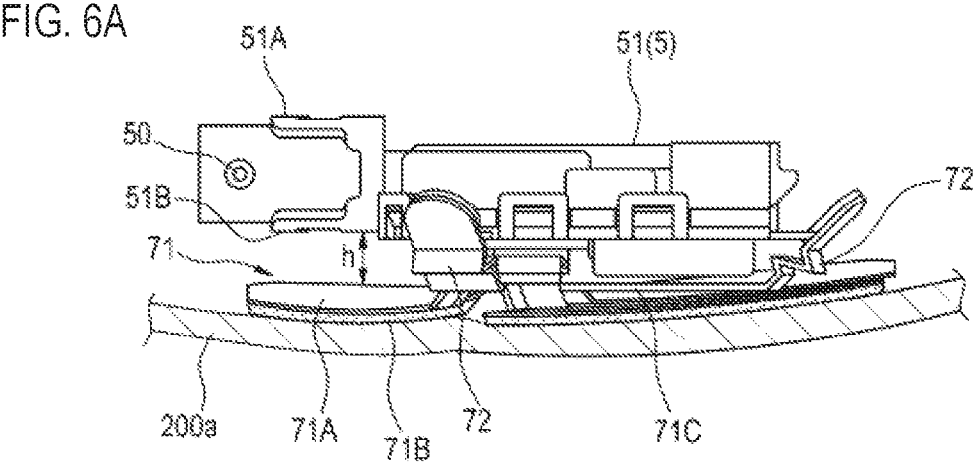
FIGS. 6A and 6B are views for explaining an adhesive member included in the foreign matter removal device.
Figure 6B:
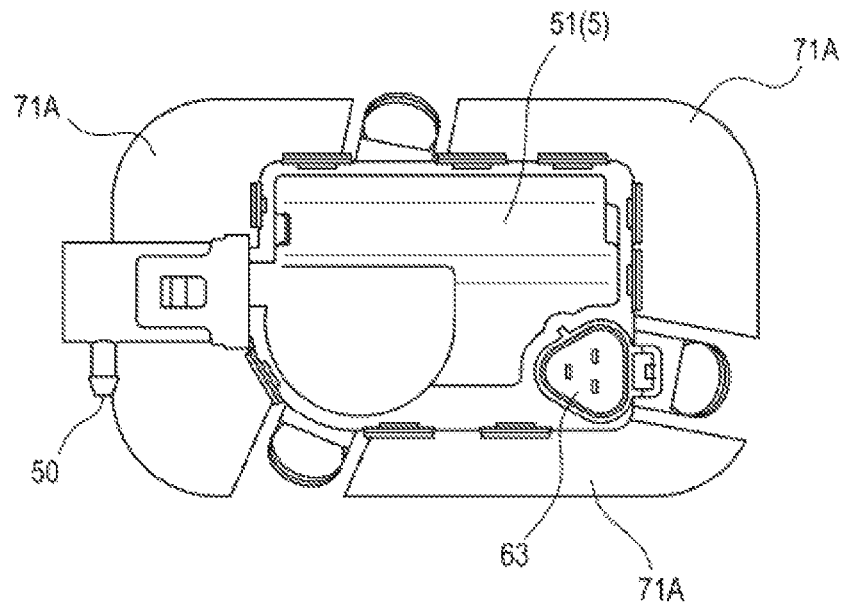
Figure 7A:
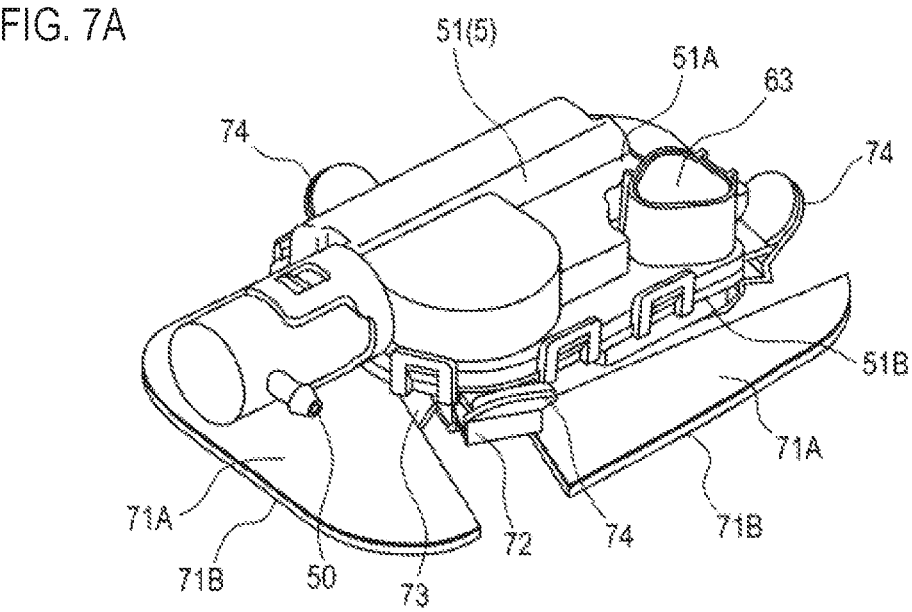
FIG. 7A is a top perspective view of FIG. 6B.
Figure 7B:
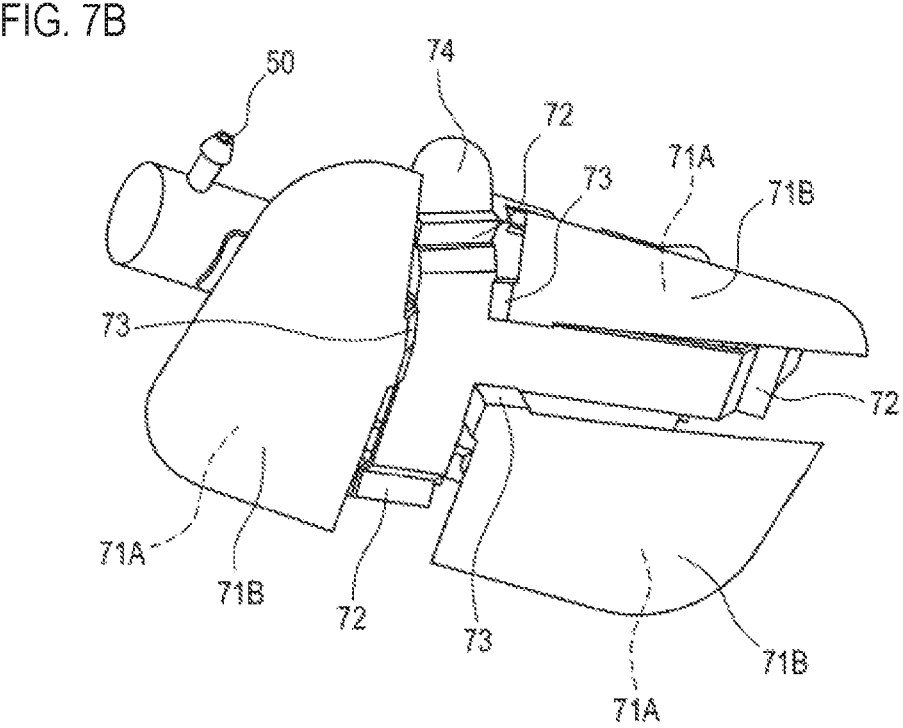
FIG. 7B is a bottom perspective view of FIG. 6B.
Figure 8A:
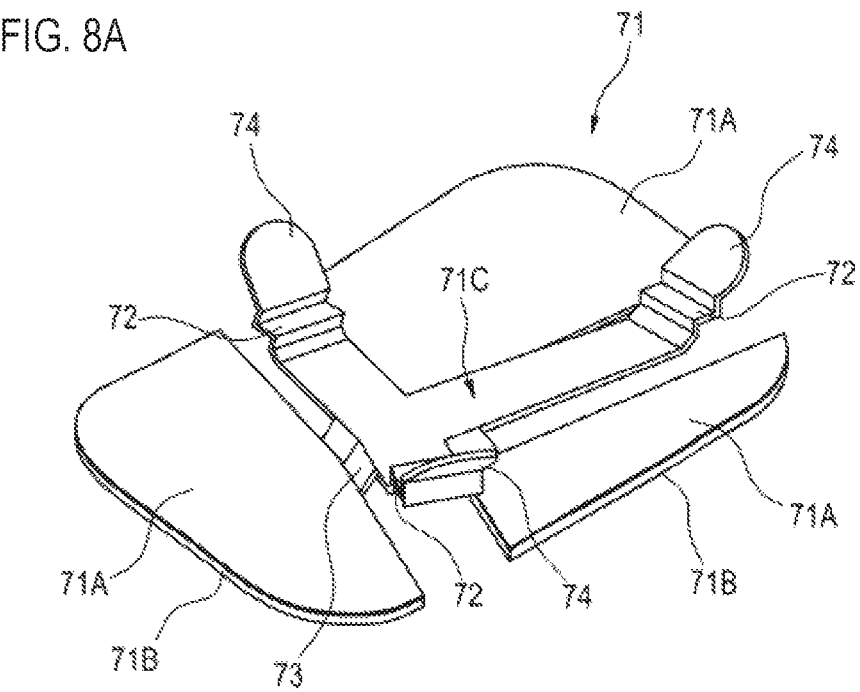
FIG. 8A is a top perspective view of the adhesive member.
Figure 8B:
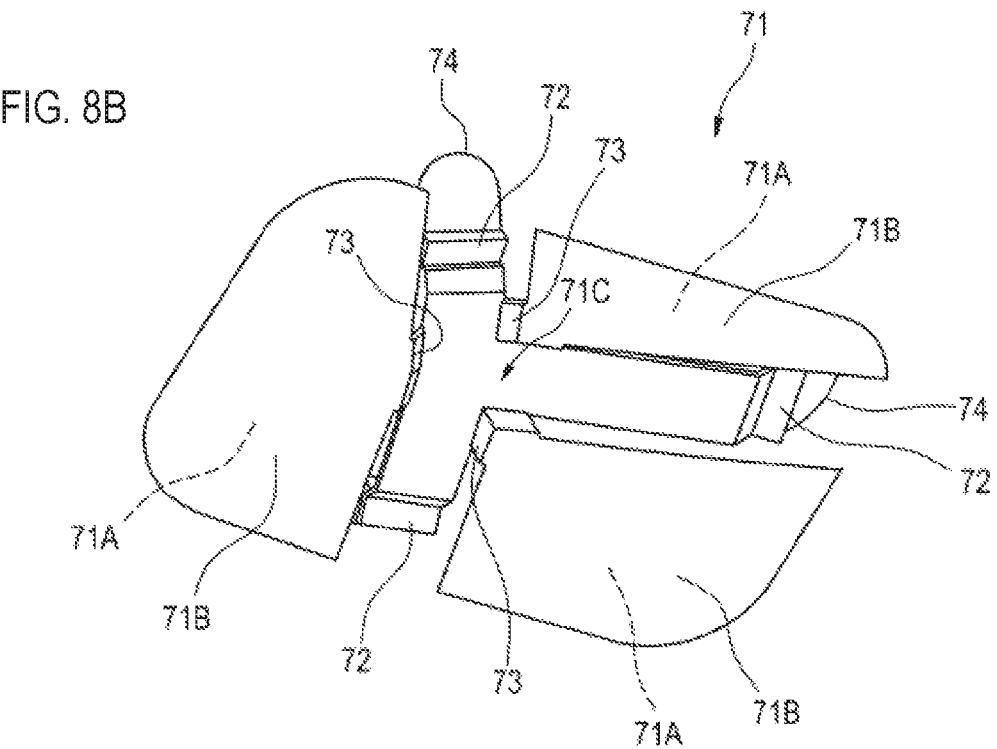
FIG. 8B is a bottom perspective view of the adhesive member.

FIG. 6A is an enlarged view of the high-pressure air generation unit 5 shown in FIG. 5. FIG. 6B is a plan view showing the high-pressure air generation unit 5 mounted on an adhesive member 71. FIGS. 7A and 7B show a top perspective view and a bottom perspective view of FIG. 6B, respectively. FIGS. 8A and 8B are views in which the high-pressure air generation unit 5 in FIGS. 7A and 7B is removed, showing a perspective view of the adhesive member 71 as seen from above and a perspective view thereof as seen from below, respectively.

As shown in FIG. 6A, the housing 51 of the high-pressure air generation unit 5 is attached to a back door panel 200a via the adhesive member 71. The adhesive member 71 has an adhesion surface portion 71A, an adhesion layer 71B, and a mounting portion 71C.

As shown in FIGS. 7A to 8B, the adhesion surface portion 71A is constituted by a plurality of (three in this example) plate-shaped members separated from each other. The adhesion layer 71B is formed on the surface of each adhesion surface portion 71A on the side facing the back door panel 200a.

The adhesion layer 71B is formed of, for example, a double-sided tape having a predetermined thickness. The adhesion layer 71B is configured so as to be elastically deformable along at least a part of the surface shape of the back door panel 200a.

The mounting portion 71C is a portion on which the housing 51 is mounted. The mounting portion 71C is formed continuously with each adhesion surface portion 71A via a continuous portion 73 formed so as to rise upward from each adhesion surface portion 71A. That is, the adhesion surface portions 71A are connected to each other via the mounting portion 71C and each continuous portion 73.

The mounting portion 71C is provided with a plurality of (three in this example) connecting portions 72 that connects the housing 51 and the mounting portion 71C. Each of the connecting portions 72 is configured to be elastically deformable (in a stepwise manner in this example). For example, a planar attachment part 74 to which the housing 51 is attached is provided at a leading end of each connecting portion 72. Each attachment part 74 is provided in such a way that it is inclined in a direction away from the adhesion surface portion 71A as approaching its leading end. The attaching surface of each attachment part 74 is set at an inclination angle toward the center of gravity of the housing 51 (the high-pressure air generation unit 5) mounted thereon. The housing 51 having three attaching surfaces to be affixed to the attachment parts 74 is attached to the attachment parts 74 via an adhesive member such as a double-sided tape, for example.

Therefore, when attaching the housing 51 mounted on the mounting portion 71C of the adhesive member 71 to the back door panel 200a, the housing 51 is attached to the back door panel 200a via the adhesive member 71 in surface contact with the back door panel 200a by elastically deforming the adhesion layer 71B of the adhesive member 71.

Further, with the configuration of the continuous portions 73, the connecting portions 72, and the attachment parts 74, the housing 51 in a state of being mounted on the mounting portion 71C is held in a state in which a gap h (see FIG. 6A) is formed between the adhesion surface portion 71A and the housing 51.

As shown in FIG. 7A, the housing 51 is formed in a substantially rectangular parallelepiped shape. A connector part 63 for supplying power to the motor 55 is formed on an upper surface (an example of the second surface) 51A of the housing 51. The housing 51 is configured such that a lower surface (an example of the first surface) 51B on the side opposite to the upper surface 51A on which the connector part 63 is formed is mounted on the mounting portion 71C of the adhesive member 71 so as to face the back door panel 200a.

As shown in FIGS. 8A and 8B, the adhesive member 71 is formed in a substantially plate shape. The adhesive member 71 is made of, for example, resin. Meanwhile, the adhesive member 71 may be made of metal.

When generating high-pressure air in the high-pressure air generation unit 5, the moving mechanism 65 inside the housing 51 is configured such that the piston 52 moves parallel (in a left and right direction in FIG. 6A) to the surface where the adhesive member 71 is in surface contact with the back door panel 200a.

According to this configuration, the housing 51 of the high-pressure air generation unit 5 is attached to the back door panel 200a of the vehicle V via the plate-shaped adhesive member 71 including the elastically deformable adhesion layer 71B. The adhesion layer 71B of the adhesive member 71 is elastically deformable along the surface shape of the back door panel 200a of the vehicle V. Therefore, even when the back door panel 200a has a curved portion or an uneven portion, the adhesion layer 71B is deformed along the curved portion or the uneven portion and makes surface contact therewith. Further, since the adhesion surface portion 71A is constituted by three separated members, the adhesion surface portion 71A is easily deformed with respect to the curved portion or the uneven portion of the back door panel 200a and is likely to make surface contact therewith. Therefore, a sufficient contact area for obtaining an adhesive force required for fixing the housing 51 on the back door panel 200a can be secured, so that the versatility at the time of attaching the high-pressure air generation unit 5 can be improved.

Further, since the gap h is formed between the adhesion surface portion 71A and the housing 51, the deformation of the adhesion layer 71B is less susceptible to the influence of the rigidity of the housing 51 of the high-pressure air generation unit 5. Therefore, the adhesion surface portion 71A is likely to be deformed along the curved portion or the uneven portion of the back door panel 200a, so that the versatility at the time of attaching the high-pressure air generation unit 5 can be further improved.

Further, since the connecting portions 72 can function as a cushioning member, the sound and vibration due to the operation of the motor (drive source) 55 are difficult to propagate to the back door panel 200a. Therefore, it is possible to suppress the occurrence of abnormal noise due to the operation of the motor 55. Further, the attaching surface of each attachment part 74 to which the housing 51 is attached is set at an inclination angle toward the center of gravity of the housing 51 (the high-pressure air generation unit 5). Therefore, the sound and vibration and the like can be effectively absorbed, so that it is possible to suppress the occurrence of abnormal noise due to the operation of the motor 55.

Further, since the in-vehicle camera 100 and the high-pressure air generation unit 5 are attached to the same back door panel 200*a*, the pipeline length of a hose or the like for delivering the high-pressure air generated by the high-pressure air generation unit 5 can be shortened and the versatility at the time of attaching the high-pressure air generation unit 5 can be further improved, as compared with a configuration in which they are attached to different members.

Further, since the high-pressure air generation unit 5 is disposed at a position closer to the hinge mechanism 201 of the back door 200A than the in-vehicle camera 100, an impact force applied to the high-pressure air generation unit 5 at the time of opening and closing the back door 200A is small, as compared with a configuration in which the high-pressure air generation unit 5 is disposed at a position far from the hinge mechanism 201. In this way, a contact area for obtaining an adhesive force required for fixing the housing 51 on the back door panel 200*a* can be reduced. Therefore, it is possible to further improve the versatility at the time of attaching the high-pressure air generation unit 5.

Further, since the upper surface 51A of the housing 51 on which the connector part 63 is formed is a surface that does not face the back door panel 200*a* of the vehicle V, the connector part 63 does not become an obstacle to the attachment when attaching the housing 51 of the high-pressure air generation unit 5 to the back door panel 200*a* of the vehicle V. Therefore, it is easy to attach the housing 51 to the back door panel 200*a* and it is also easy to secure a wiring for power supply. In this way, it is possible to further improve the versatility at the time of attaching the high-pressure air generation unit 5.

Further, since the piston type moving mechanism 65 is adopted, high-pressure air can be generated by the small motor 55. Therefore, the high-pressure air generation unit 5 can be reduced in size and weight, so that the housing 51 can be sufficiently fixed even by an attachment method using the surface contact of a double-sided tape. In this way, it is possible to further improve the versatility at the time of attaching the high-pressure air generation unit 5.

Further, since the high-pressure air is continuously generated by moving the piston 52 at a high speed, it is possible to improve the performance of removing foreign matters from the lens 101. Moreover, most of the reaction force applied to the housing 51 when the piston 52 is moved at a high speed is parallel to the surface (contact surface) where the adhesive member 71 makes surface contact with the back door panel 200*a*, and the component of the reaction force in the direction intersecting with the contact surface is relatively small. Therefore, for example, even when the piston 52 is continuously moved at a high speed and the reaction force at that time is continuously applied to the housing 51, the adhesive member 71 is prevented from being detached from the back door panel 200*a* because the force of the component in the direction in which the adhesive member 71 is detached from the back door panel 200*a* is small.

Next, a modified example of the adhesive member 71 in the above-described embodiment will be described with reference to FIGS. 9 to 10C.

Figure 9:
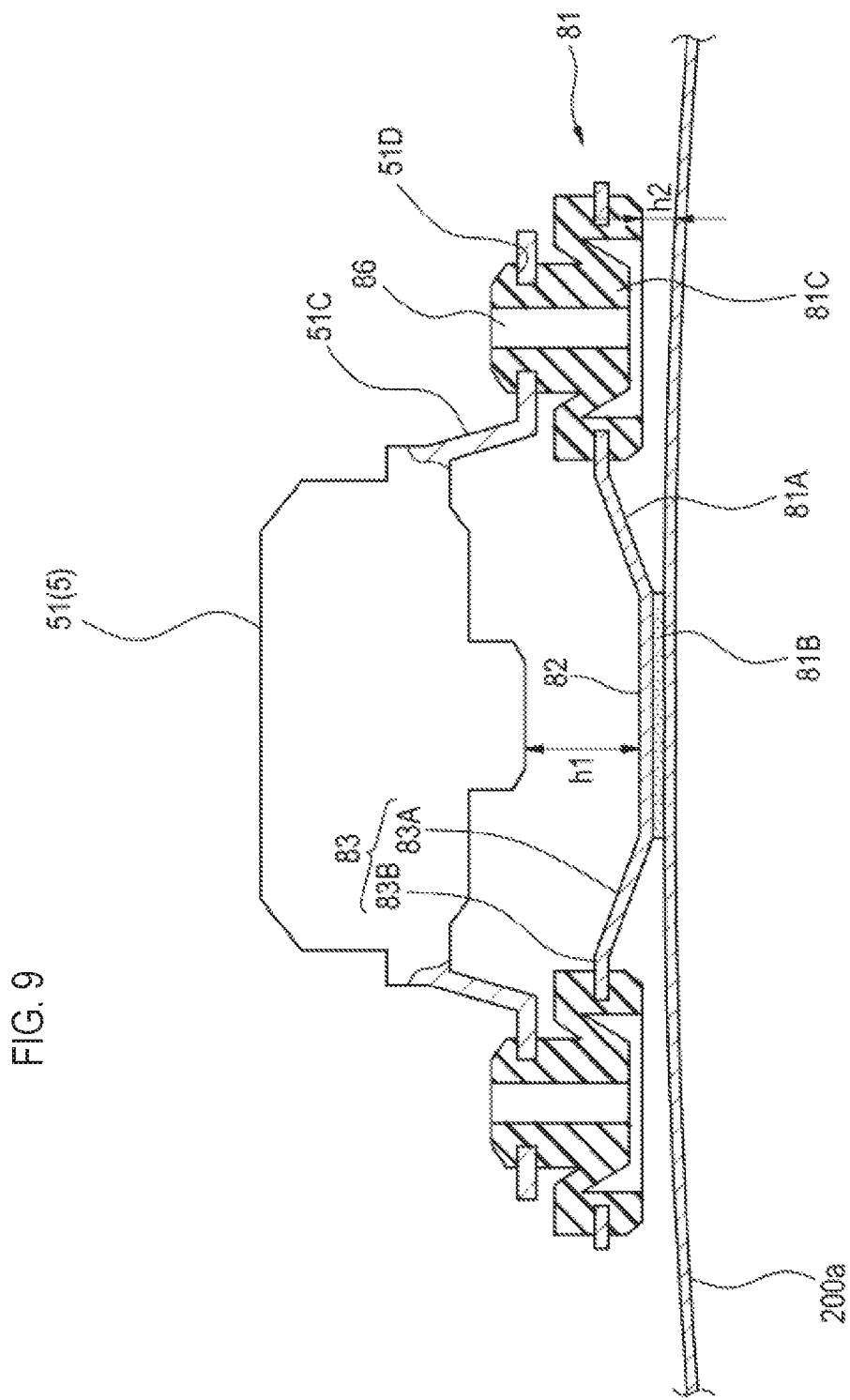
FIG. 9 is a view for explaining a modified example of the adhesive member.
Figure 10A:
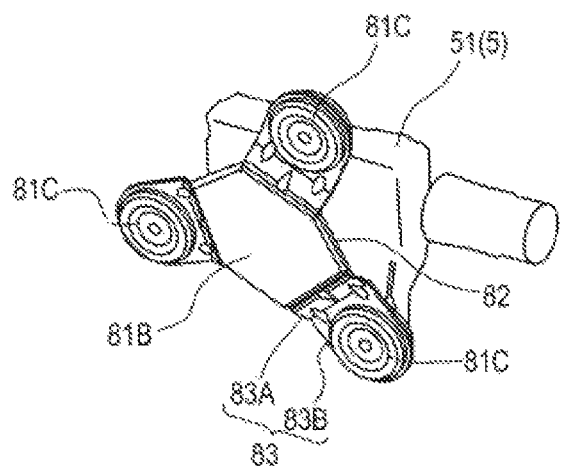
FIGS. 10A, 10B and 10C are perspective views showing an assembled state of a member included in the adhesive member.
Figure 10B:
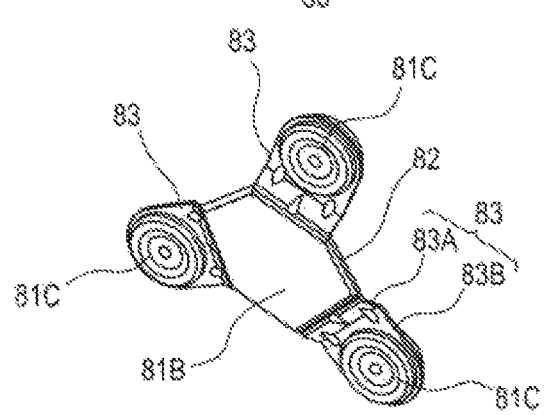
Figure 10C:
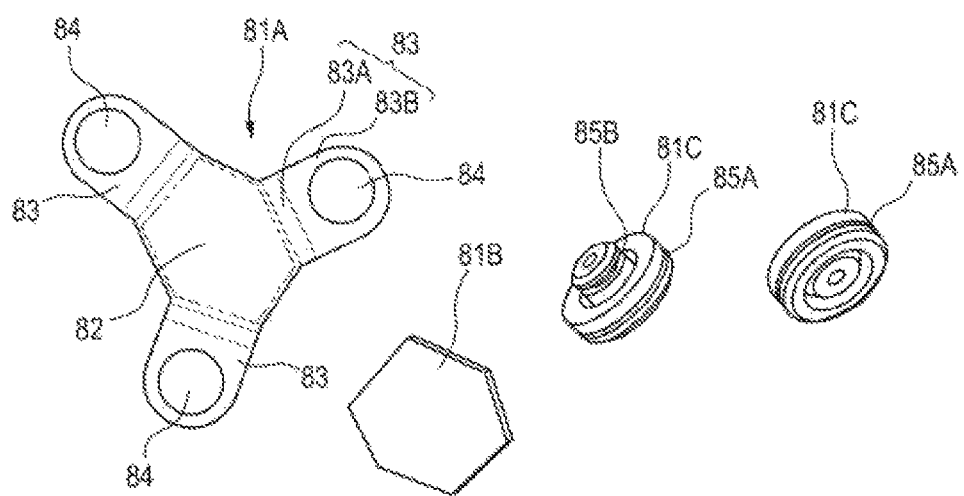

FIG. 9 shows a state in which the high-pressure air generation unit 5 is attached to the back door panel 200*a* via an adhesive member 81 of the modified example. FIG. 10A shows a perspective view of the high-pressure air generation unit 5 connected to the adhesive member 81, as seen from below. FIG. 10B shows a perspective view of the adhesive member 81, as seen from below. FIG. 10C shows an exploded state of the members constituting the adhesive member 81.

The adhesive member 81 includes an adhesive surface portion 81A, an adhesive layer 81B, and a rubber damper (an example of the connection member) 81C.

The adhesive surface portion 81A has a central plate 82 having a polygonal shape (regular hexagonal shape in this example), and a plurality of (three in this example) equally spaced attachment plates 83 extending continuously outward from an outer periphery of the central plate 82. The adhesive surface portion 81A is formed of an iron plate bracket, for example.

The adhesive layer 81B constituted by, for example, a double-sided tape is formed on the surface of the central plate 82 on the side facing the back door panel 200*a*. The adhesive layer 81B has a predetermined thickness and is configured to be elastically deformable along at least a part of the surface shape of the back door panel 200*a*. Each of the attachment plates 83 has an inclined portion 83A provided to be inclined, and a flat portion 83B provided parallel to the central plate 82. The flat portion 83B is provided with an attachment hole 84 to which the rubber damper 81C is attached.

The rubber damper 81C is a rubber member that connects the adhesive surface portion 81A and the housing 51. The damper may be made of a resin having excellent elasticity. The rubber damper 81C has a disc shape. A first groove 85A and a second groove 85B are provided on an outer peripheral portion of the rubber damper 81C. The attachment hole 84 of the attachment plate 83 of the adhesive surface portion 81A is fitted in the first groove 85A. An attachment hole 51D of a connecting portion 51C of the housing 51 is fitted in the second groove 85B. A hole 86 penetrating in the upper and lower direction is provided in the central portion of the rubber damper 81C. Further, a crank-shaped portion is provided over the entire circumference of the rubber damper 81C.

Therefore, when attaching the housing 51 connected to the adhesive member 81 to the back door panel 200*a*, the housing 51 is attached to the back door panel 200*a* via the adhesive member 81 in surface contact with the back door panel 200*a* by elastically deforming the adhesive layer 81B of the adhesive member 81.

Further, the housing 51 in a state of being fixed by the rubber damper 81C is held in a state in which a gap h1 (see FIG. 9) is formed between the adhesion surface portion 81A and the housing 51. Further, for example, a gap h2 is secured between the rubber damper 81C and the back door panel 200*a*.

According to this configuration, since the gap h1 is formed between the adhesive surface portion 81A and the housing 51, the deformation of the adhesion layer 81B is less susceptible to the influence of the rigidity of the housing 51 of the high-pressure air generation unit 5. Therefore, the adhesion surface portion 81A is likely to be deformed along the curved portion or the uneven portion of the back door panel 200*a*, so that the versatility at the time of attaching the high-pressure air generation unit 5 can be further improved. Further, since the rubber damper 81C can be elastically deformed and function as a cushioning member, the sound and vibration due to the operation of the motor 55 are absorbed and are difficult to propagate to the panel member. Therefore, it is possible to suppress the occurrence of abnormal noise due to the operation of the motor 55.

Next, a modified example of the adhesive surface portion 81A constituting the adhesive member 81 will be described with reference to FIG. 11.

Figure 11:
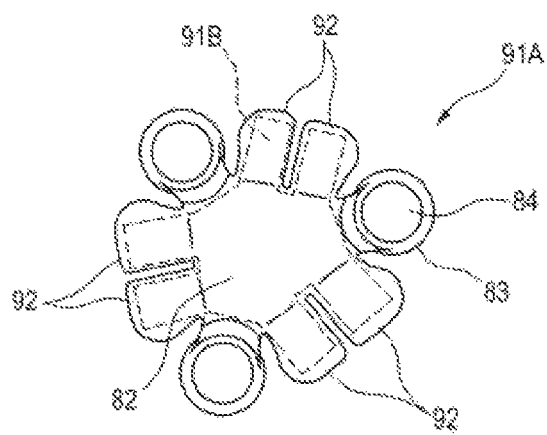
FIG. 11 is a view showing a modified example of an adhesive surface portion included in the adhesive member.

For example, as shown in FIG. 11, an adhesive surface portion 91A of the modified example may have a flange portion 92 that can be bent and deformed. In this case, a double-sided tape (adhesion layer) 91B is formed so as to correspond to the shape of the flange portion 92.

According to this configuration, since the adhesive surface portion 91A is easily brought into contact with the back door panel 200a by being deformed following the curved portion or the uneven portion of the back door panel 200a particularly at the flange portion 92, the versatility during attachment is further improved.

Second Embodiment

Next, a second embodiment will be described. The same members as those in the first embodiment are denoted by the same reference numerals, and explanation thereof will be omitted.

Figure 12:
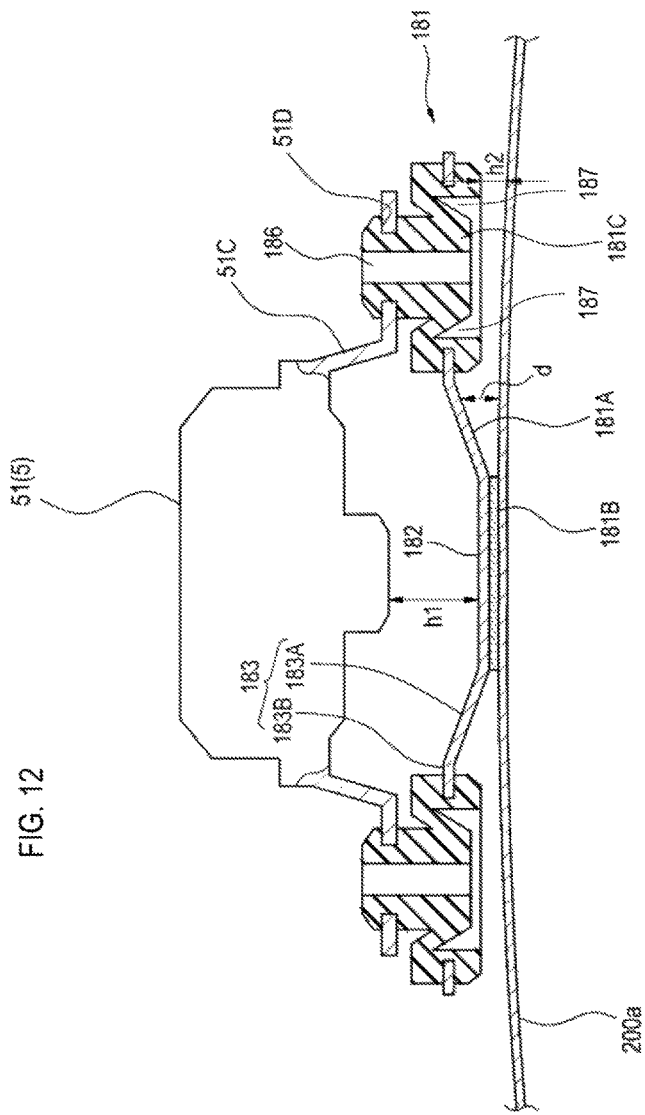
FIG. 12 is a view for explaining an attachment state of a high-pressure air generation unit constituting a foreign matter removal device according to a second embodiment.
Figure 13A:
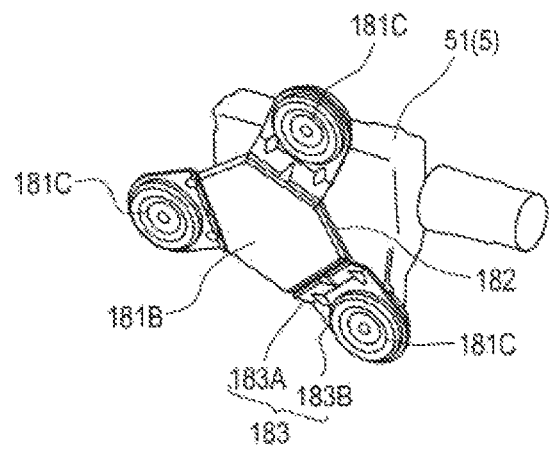
FIGS. 13A, 13B and 13C are perspective views for explaining each attachment member to which the high-pressure air generation unit is attached.
Figure 13B:
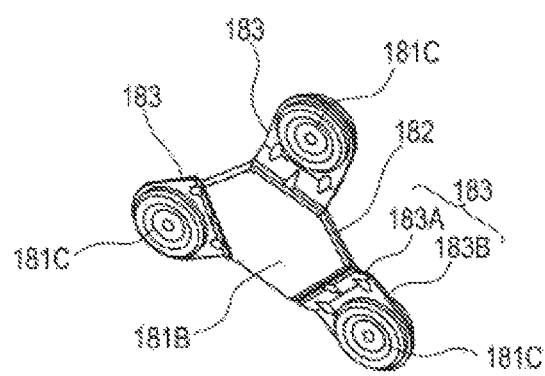
Figure 13C:
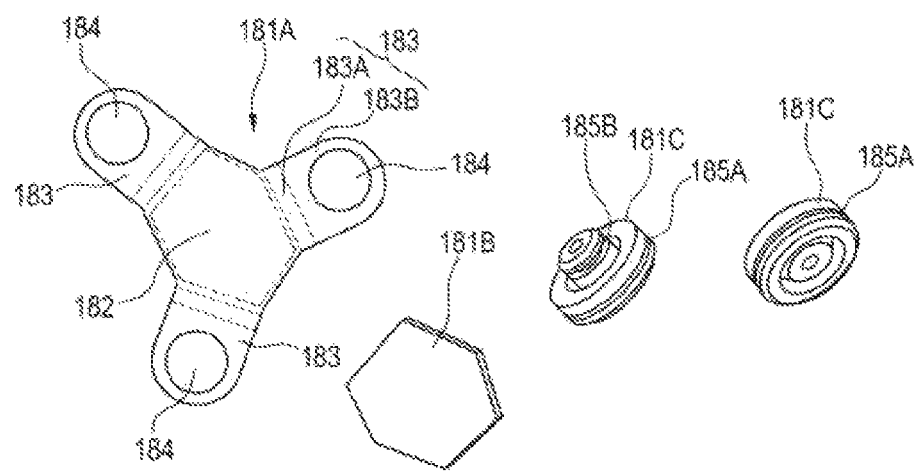

FIG. 12 is a partial enlarged view of the high-pressure air generation unit 5. FIG. 13A shows a perspective view of the high-pressure air generation unit 5 connected to an adhesive unit 181, as seen from below. FIG. 13B shows a perspective view of the adhesive unit 181, as seen from below. FIG. 13C shows an exploded state of the members constituting the adhesive unit 181.

As shown in FIG. 12, the housing 51 of the high-pressure air generation unit 5 is attached to the back door panel 200a via the adhesive unit 181. The adhesive unit 181 includes a fixing member 181A, an adhesive member 181B, and a plurality of (three in this example) rubber dampers (an example of the connecting member) 181C.

The fixing member 181A is formed in a plate shape and has a central plate 182 having a polygonal shape (regular hexagonal shape in this example), and a plurality of (three in this example) equally spaced attachment plates 183 extending continuously outward from an outer periphery of the central plate 182. The fixing member 181A is formed of an iron plate bracket, for example. Meanwhile, the fixing member 181A may be formed of a resin material.

The adhesive member 181B constituted by, for example, a double-sided tape is attached on the surface (back surface) of the central plate 182 on the side facing the back door panel 200a. The adhesive member 181B includes an elastically deformable adhesion layer that has a predetermined thickness. The central plate 182 is fixed to the back door panel 200a via the adhesive member 181B.

Each of the attachment plates 183 has an inclined portion 183A provided to be inclined, and a flat portion 183B provided parallel to the central plate 182. The flat portion 183B is provided with an attachment hole 184 to which the rubber damper 181C is attached. The inclined portion 183A is inclined upward such that a distance d in the vertical direction to the central plate 182 is increased away from the central plate 182.

Each rubber damper 181C is formed of a rubber member having elasticity and is configured to connect the fixing member 181A and the housing 51. Meanwhile, the damper may be made of a resin having the same elasticity as the rubber damper 181C. The rubber damper 181C has a disc shape. A first groove 185A and a second groove 185B are provided on an outer peripheral portion of the rubber damper 181C. An inner peripheral portion of the attachment hole 184 of the attachment plate 183 of the fixing member 181A is fitted in the first groove 185A. An inner peripheral portion of the attachment hole 51D of the connecting portion 51C of the housing 51 is fitted in the second groove 185B. A through-hole 186 penetrating in the upper and lower direction is provided in the central portion of the rubber damper 181C. Further, the rubber damper 181C is provided with a crank-shaped portion 187 over the entire circumference of the rubber damper 181C.

When attaching the housing 51 connected to the rubber dampers 181C to the back door panel 200a, the housing 51 is attached to the back door panel 200a via the fixing member 181A in surface contact with the back door panel 200a by elastically deforming the adhesive member 181B of the central plate 182 along at least a part of the surface shape of the back door panel 200a.

Further, in a state in which the central plate 182 of the fixing member 181A is fixed to the back door panel 200a via the adhesive member 181B, and the housing 51 is connected to the rubber dampers 181C, the housing 51 is held in a state in which a sufficient gap h1 (see FIG. 12) is formed between the fixing member 181A and the housing 51. In this case, the housing 51 is connected to the rubber dampers 181C so that the position of the center of the housing 51 overlaps with the position of the center of the adhesive member 181B. Further, since the inclined portion 183A is inclined in a direction away from the back door panel 200a, in this example, a gap h2 is secured between the rubber dampers 181C and the back door panel 200a.

Further, when generating high-pressure air in the high-pressure air generation unit 5, the moving mechanism 65 inside the housing 51 is configured such that the piston 52 moves parallel to the surface where the fixing member 181A is attached to the back door panel 200a.

According to this configuration, the high-pressure air generation unit 5 is attached to the back door panel 200a in a state in which the gap h1 is formed between the back door panel 200a and the high-pressure air generation unit 5. Therefore, the sound and vibration due to the operation of the motor 55 of the high-pressure air generation unit 5 are reduced by the rubber dampers 181C capable of absorbing the vibration and are difficult to propagate to the back door panel 200a of the vehicle V. In this way, the sound and vibration due to the operation of the motor 55 of the high-pressure air generation unit 5 are prevented from being resonated by the back door panel 200a, and hence, the occurrence of abnormal noise can be suppressed.

Further, the plate-shaped adhesive member 181B including an elastically deformable adhesion layer can also function as a cushioning member. Therefore, the sound and vibration due to the operation of the motor 55 can be also buffered by the adhesive member 181B, so that the sound and vibration are further difficult to propagate to the back door panel 200a. In this way, the occurrence of abnormal noise due to the operation of the motor 55 is further suppressed.

Further, since each rubber damper 181C is formed of an elastic member and is provided with the through-hole 186 and the crank-shaped portion 187, the rubber damper 181C is likely to be elastically deformed. Each of the plurality of rubber dampers 181C can disperse and reduce the sound and vibration due to the operation of the motor 55. Moreover, even when an impact is applied to the housing 51 of the high-pressure air generation unit 5 due to, for example, an external factor such as when opening and closing the back door 200A, each rubber damper 181C can disperse and reduce the impact.

Further, since the housing 51 is connected to the rubber dampers 181C so that the position of the center of the housing 51 overlaps with the position of the center of the adhesive member 181B, the sound and vibration due to the operation of the motor 55 can be reduced by being equally dispersed to each of the rubber dampers 181C. Therefore, as compared with a case where sound and vibration are unevenly dispersed to the rubber dampers 181C, the occurrence of abnormal noise due to the operation of the motor 55 can be suppressed.

Further, since the high-pressure air generation unit 5 is disposed at a position closer to the hinge mechanism 201 of the back door 200A than the in-vehicle camera 100, an impact force applied to the high-pressure air generation unit 5 at the time of opening and closing the back door 200A is small, as compared with a configuration in which the high-pressure air generation unit 5 is disposed at a position far from the hinge mechanism 201. In this way, it is possible to reduce a contact area for obtaining an adhesive force required for fixing the housing 51 on the back door panel 200a. Therefore, it is possible to further improve the versatility at the time of attaching the high-pressure air generation unit 5.

Further, since the piston type moving mechanism 65 is adopted, high-pressure air can be generated by the small motor 55. Therefore, the high-pressure air generation unit 5 can be reduced in size and weight, and the sound and vibration due to the operation of the drive source can be reduced.

Further, since the high-pressure air is continuously generated by moving the piston 52 at a high speed, it is possible to improve the performance of removing foreign matters from the lens 101. Moreover, most of the reaction force applied to the housing 51 when the piston 52 is moved at a high speed is parallel to the surface (attaching surface) where the fixing member 181A is attached to the back door panel 200a, and the component of the reaction force in the direction intersecting with the attaching surface is relatively small. Therefore, for example, even when the piston 52 is continuously moved at a high speed and the reaction force at that time is continuously applied to the housing 51, the fixing member 181A is prevented from being detached from the back door panel 200a because the force of the component in the direction in which the fixing member 181A is detached from the back door panel 200a is small.

Figure 14A:
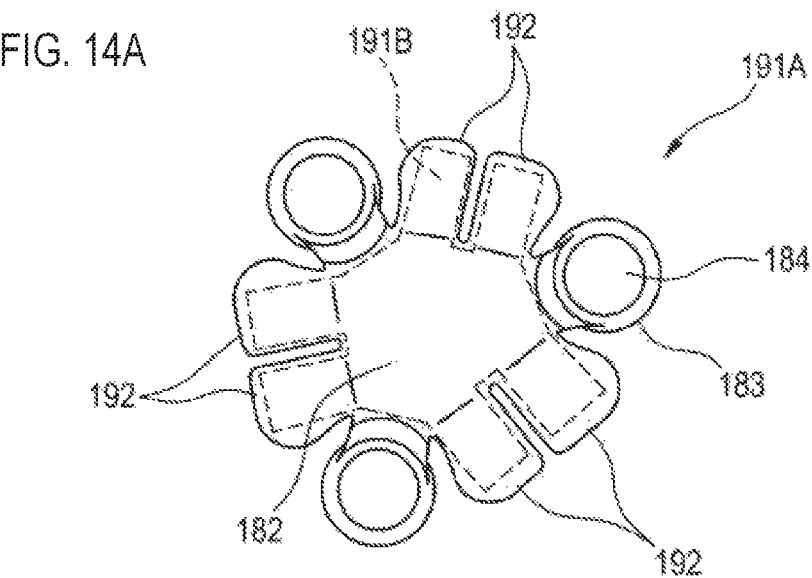
FIGS. 14A and 14B are views showing modified examples of the attachment member.

Meanwhile, the structure of the fixing member 181A is not limited to the above-described configuration. For example, as shown in FIG. 14A, a fixing member 191A may have a flange portion 192 that can be bent and deformed. In this case, a double-sided tape 191B is formed so as to correspond to the shape of the flange portion 192.

According to this configuration, since the fixing member 191A is easily brought into contact with the back door panel 200a by being deformed following the curved portion or the uneven portion of the back door panel 200a particularly at the flange portion 192, the versatility during attachment is further improved.

Figure 14B:
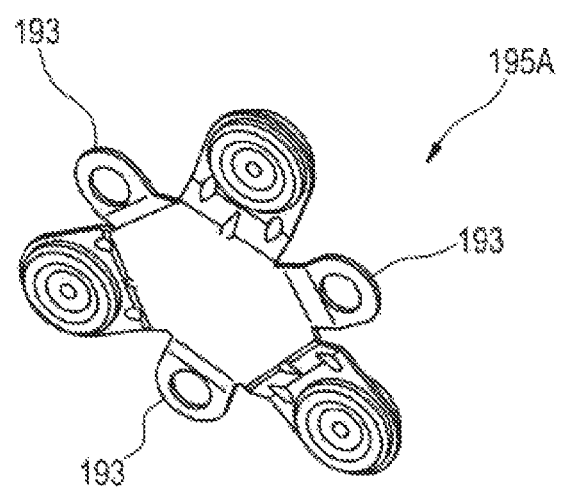

Further, for example, as shown in FIG. 14B, a fixing member 195A may have an attaching portion 193 to be attached by bolt fastening. The attaching portion 193 is formed of the same iron plate as the other portion of the fixing member 195A.

According to this configuration, the occurrence of abnormal noise due to the operation of the motor 55 can be suppressed by the rubber dampers 181C while securely fixing the fixing member 195A to the back door panel 200a by using a bolt.

Next, a modified example of the fixing member 181A and the connecting member (rubber damper) 181C in the above-described embodiment will be described with reference to FIGS. 15A to 17B.

Figure 15A:
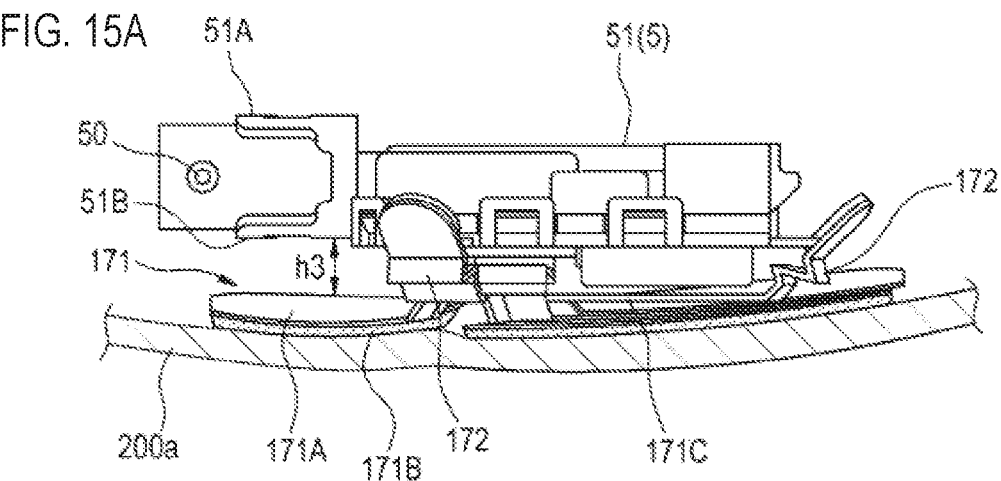
FIG. 15A shows the high-pressure air generation unit fixed to a back door panel.
Figure 15B:
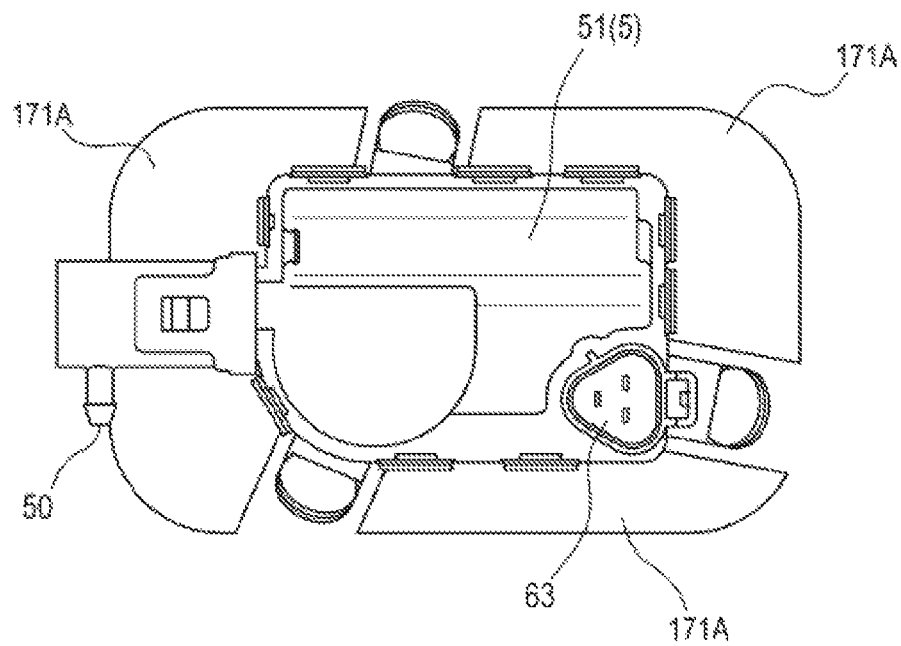
FIG. 15B shows a plan view of FIG. 15A.
Figure 16A:
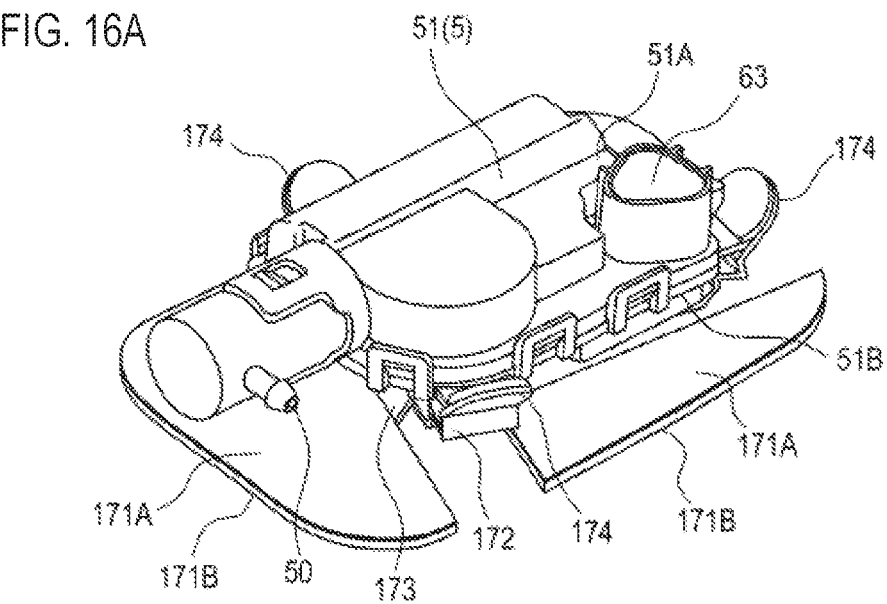
FIG. 16A is a top perspective view of FIG. 15B.
Figure 16B:
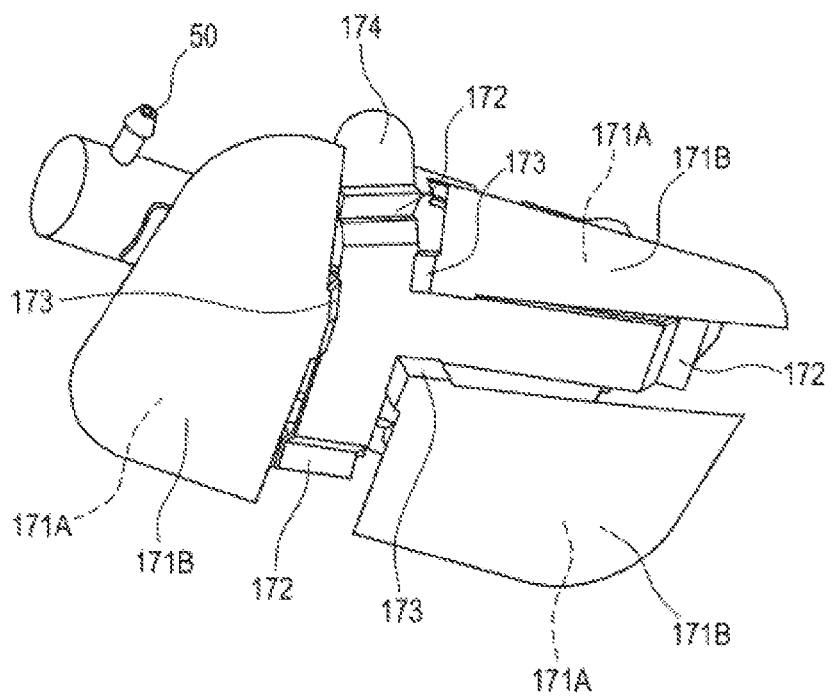
FIG. 16B is a bottom perspective view of FIG. 15B.
Figure 17A:
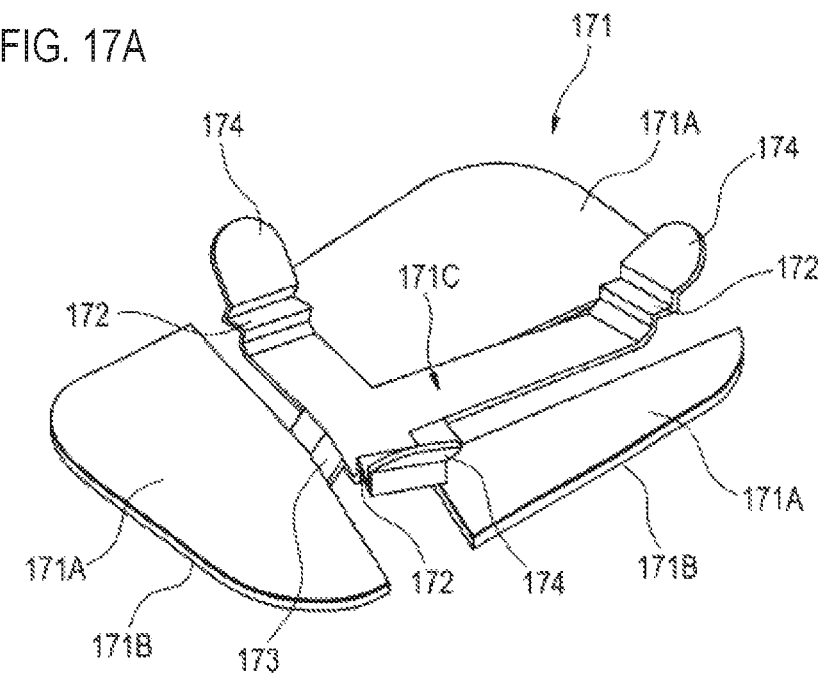
FIG. 17A is a top perspective view of the adhesive member.
Figure 17B:
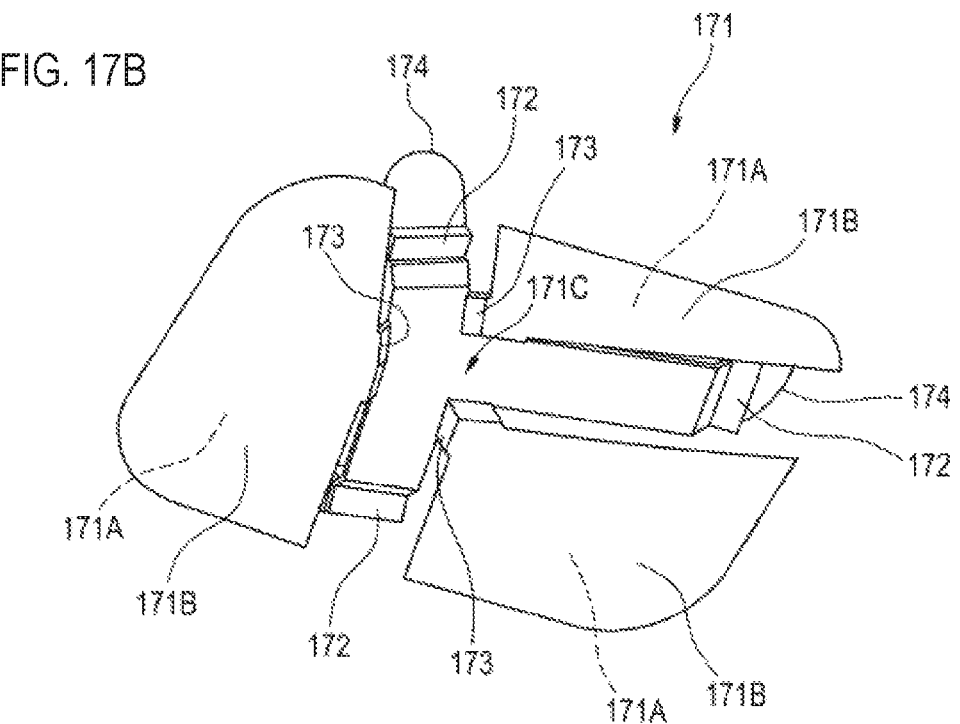
FIG. 17B is a bottom perspective view of the adhesive member.

FIG. 15A shows the high-pressure air generation unit 5 attached to the back door panel 200a via an adhesive member 171. FIG. 15B is a plan view showing the high-pressure air generation unit 5 mounted on the adhesive member 171. FIGS. 16A and 16B show a top perspective view and a bottom perspective view of FIG. 15B, respectively. FIGS. 17A and 17B are views in which the high-pressure air generation unit 5 in FIGS. 16A and 16B is removed, showing a perspective view of the adhesive member 171 as seen from above and a perspective view thereof as seen from below, respectively.

As shown in FIG. 15A, the housing 51 of the high-pressure air generation unit 5 is attached to the back door panel 200a via the adhesive member 171. The adhesive member 171 includes a fixing member 171A, an adhesion layer 171B, and a mounting portion 171C (see FIG. 17A).

As shown in FIGS. 16A to 17B, the fixing member 171A is constituted by a plurality of (three in this example) plate-shaped members separated from each other. The adhesion layer 171B is formed on the surface of each fixing member 171A on the side facing the back door panel 200a.

The adhesion layer 171B is formed of, for example, a double-sided tape having a predetermined thickness. The adhesion layer 171B is configured so as to be elastically deformable along at least a part of the surface shape of the back door panel 200a.

The mounting portion (an example of the connecting member) 171C is a portion on which the housing 51 is mounted. The mounting portion 171C is formed continuously with each fixing member 171A via a continuous portion 173 formed so as to rise upward from each fixing member 171A. That is, the fixing members 171A are connected to each other via the mounting portion 171C and each continuous portion 173. The fixing member 171A and the mounting portion 171C are integrally formed of the same material.

The mounting portion 171C is provided with a plurality of (three in this example) connecting portions 172 that connects the housing 51 and the mounting portion 171C. Each of the connecting portions 172 is configured to be elastically deformable (in a stepwise manner in this example). For example, a planar attachment part 174 to which the housing 51 is attached is provided at a leading end of each connecting portion 172. Each attachment part 174 is provided in such a way that it is inclined in a direction away from the fixing member 171A as approaching its leading end. The attaching surface of each attachment part 174 is set at an inclination angle toward the center of gravity of the housing 51 (the high-pressure air generation unit 5) mounted thereon. The housing 51 having three attaching surfaces to be affixed to the attachment parts 174 is attached to the attachment parts 174 via an adhesive member such as a double-sided tape, for example.

Therefore, when attaching the housing 51 mounted on the mounting portion 171C of the adhesive member 171 to the back door panel 200a, the housing 51 is attached to the back door panel 200a via the adhesive member 171 in surface contact with the back door panel 200a by elastically deforming the adhesion layer 171B of the adhesive member 171.

Further, with the configuration of the continuous portions 173, the connecting parts 172, and the attachment parts 174, the housing 51 in a state of being mounted on the mounting portion 171C is held in a state in which a gap h3 (see FIG. 15A) is formed between the fixing member 171A and the housing 51.

As shown in FIG. 16A, the housing 51 is formed in a substantially rectangular parallelepiped shape. The connector part 63 for supplying power to the motor 55 is formed on the upper surface 51A of the housing 51. The housing 51 is configured such that the lower surface 51B on the side opposite to the upper surface 51A on which the connector part 63 is formed is mounted on the mounting portion 171C of the adhesive member 171 so as to face the back door panel 200a.

As shown in FIGS. 17A and 17B, the adhesive member 171 is formed in a substantially plate shape. The adhesive member 171 is made of, for example, resin. Meanwhile, the adhesive member 171 may be made of metal.

According to this configuration, since the fixing member 171A and the mounting portion 171C are integrally formed of the same material, the number of parts can be reduced and the cost can be reduced.

Further, the fixing member 171A is constituted by a plurality of plate-shaped members separated from each other. Therefore, even when an impact is applied to the housing 51 of the high-pressure air generation unit 5 due to, for example, an external factor such as when opening and closing the back door 200A, each of the plate-shaped members can disperse and reduce the impact.

Further, since the connecting portions 172 can function as a cushioning member, the sound and vibration due to the operation of the motor (drive source) 55 are difficult to propagate to the back door panel 200a. Therefore, it is possible to suppress the occurrence of abnormal noise due to the operation of the motor 55. Further, the attaching surface of each attachment part 174 to which the housing 51 is attached is set at an inclination angle toward the center of gravity of the housing 51 (the high-pressure air generation unit 5). Therefore, the sound and vibration and the like can be effectively absorbed, so that it is possible to suppress the occurrence of abnormal noise due to the operation of the motor 55.

Further, since the gap h3 is formed between the fixing member 171A and the housing 51, the deformation of the adhesion layer 171B is less susceptible to the influence of the rigidity of the housing 51 of the high-pressure air generation unit 5. Therefore, the fixing member 171A is likely to be deformed along the curved portion or the uneven portion of the back door panel 200a, so that the versatility at the time of attaching the high-pressure air generation unit 5 can be further improved.

Meanwhile, the present invention is not limited to the above-described embodiments, but can be appropriately deformed or improved. In addition, the materials, shapes, dimensions, numerical values, modes, quantities, and locations and the like of the respective components in the above-described embodiments are arbitrary and not limited as long as they can achieve the present invention.

For example, in the above examples, the application to the in-vehicle camera has been described. However, the object to which the present invention is applied is not limited as long as it is a camera used outdoors. For example, a camera mounted so as to be exposed to the outside of an airplane, a railroad, a ship, a robot, an outdoor installation object, a building and the like may be included.

Although the present invention has been described in detail with reference to specific embodiments thereof, it will be apparent to one skilled in the art that various changes and modifications can be made therein without departing from the spirit and scope thereof.

The present application is based on Japanese Patent Application (Patent Application No. 2015-131781) filed on Jun. 30, 2015, and Japanese Patent Application (Patent Application No. 2015-131782) filed on Jun. 30, 2015, the contents of which are incorporated herein by reference.

REFERENCE NUMERALS LIST

1: Foreign Matter Removal Device, 2: Nozzle Unit, 3: Joint Member, 4: Hose, 5: High-Pressure Air Generation Unit, 21: Attachment Part, 22: Nozzle. 51: Housing, 58: Urging Spring (Elastic Member), 65: Moving Mechanism (Generation Unit), 71: Adhesive Member, 71A: Adhesion Surface Portion, 71B: Adhesion Layer, 71C: Mounting Portion, 72: Connecting portion, 73: Continuous portion. 74: Attachment Part, 81A: Adhesion Surface Portion, 81B: Adhesion Layer, 81C: Rubber Damper (an example of connection member), 82: Central Plate, 83: Attachment Plate, 83A: Inclined Portion, 83B: Flat Portion, 84: Attachment Hole, 85A: First Groove, 85B: Second Groove, 86: Hole, 100: In-Vehicle Camera, 101: Lens, 102: Housing, 200A: Back Door, 200a: Back Door Panel, 201: Hinge Mechanism, V: Vehicle

What is claimed is:

1. A foreign matter removal device which removes foreign matters on a lens of an in-vehicle camera attached to a vehicle so that the lens of the in-vehicle camera is exposed toward the outside of a body panel of a vehicle, the foreign matter removal device comprising:
a high-pressure air generation unit that includes a generation unit having a drive source and configured to generate high-pressure air using the drive source, and a housing covering the generation unit; and
a plate-shaped adhesive member that includes an adhesion layer elastically deformable along at least a part of a surface shape of a panel member constituting the vehicle,
wherein the housing is attached to the panel member via the adhesive member in surface contact with the panel member.

2. The foreign matter removal device according to claim 1, wherein
the adhesive member has an adhesive surface portion on which the adhesion layer is formed, and a mounting portion which is formed continuously with the adhesive surface portion and on which the housing can be mounted, and
a gap is formed between the adhesive surface portion and the housing in a state in which the housing is mounted on the mounting portion.

3. The foreign matter removal device according to claim 2, wherein
the adhesive surface portion includes at least three plate-shaped members separated from each other, and
the plate-shaped members are connected to each other via the mounting portion.

4. The foreign matter removal device according to claim 2, wherein
the mounting portion has a connecting portion that connects the housing and the mounting portion, and
the connecting portion is configured to be elastically deformable.

5. The foreign matter removal device according to claim 1, wherein the adhesive member has an adhesive surface portion on which the adhesion layer is at least partially formed, and a connector that connects the adhesive surface portion and the housing, and a gap is formed between the adhesive surface portion and the housing in a state in which the housing is fixed by the connector.

6. The foreign matter removal device according to claim 5, wherein the connector is formed of an elastic material.

7. The foreign matter removal device according to claim 5, wherein the adhesive surface portion has a flange portion that can be bent and deformed.

8. The foreign matter removal device according to claim 1, wherein the in-vehicle camera and the high-pressure air generation unit are attached to the panel member.

9. The foreign matter removal device according to claim 1, wherein the panel member is a back door panel constituting an outer surface of a back door of the vehicle, the in-vehicle camera is attached to the back door panel, and the high-pressure air generation unit is disposed at a position closer to a hinge mechanism of the back door panel than the in-vehicle camera.

10. The foreign matter removal device according to claim 1, wherein the housing has a first surface facing the panel member and a second surface on which a connector part that supplies power to the drive source is formed, and the second surface is provided as a surface different from the first surface.

11. The foreign matter removal device according to claim 1, wherein the generation unit has a piston and an elastic member, and the generation unit generates the high-pressure air by storing an elastic force of the elastic member by using the drive source and releasing the elastic force to move the piston at a high speed.

12. The foreign matter removal device according to claim 11, wherein the generation unit continuously generates the high-pressure air by repeatedly moving the piston at a high speed by using the drive source and the elastic member.

13. The foreign matter removal device according to claim 11, wherein a movement direction of the piston when generating the high-pressure air is parallel to the surface where the adhesive member makes surface contact with the panel member.

14. A vehicle comprising the foreign matter removal device according to claim 1.

15. A foreign matter removal device which removes foreign matters on a lens of an in-vehicle camera attached to a vehicle so that the lens of the in-vehicle camera is exposed toward the outside of a body panel of a vehicle, the foreign matter removal device comprising:

a high-pressure air generation unit that includes a generation unit having a drive source and configured to generate high-pressure air using the drive source, and a housing covering the generation unit, a plate-shaped fixing member fixed to a panel member constituting a vehicle; and a connector that connects the fixing member and the high-pressure air generation unit and is capable of absorbing vibration, wherein a gap is formed between the fixing member and the housing in a state in which the fixing member is fixed to the panel member and the housing is connected to the connector.

16. The foreign matter removal device according to claim 15, wherein the fixing member is fixed to the panel member via an adhesive member having an elastically deformable adhesion layer.

17. The foreign matter removal device according to claim 15 wherein the connector includes a plurality of elastic members.

18. The foreign matter removal device according to claim 15, wherein the fixing member has a flange portion that can be bent and deformed.

19. The foreign matter removal device according to claim 15, wherein the fixing member and the connector are integrally formed of the same material.

20. The foreign matter removal device according to claim 19, wherein the fixing member includes a plurality of plate-shaped members separated from each other, and the plate-shaped members are connected to each other via the connector.

21. The foreign matter removal device according to claim 15, wherein the panel member is a back door panel constituting an outer surface of a back door of the vehicle, the in-vehicle camera is attached to the back door panel, and the high-pressure air generation unit is disposed at a position closer to a hinge mechanism of the back door panel than the in-vehicle camera.

22. The foreign matter removal device according to claim 15, wherein the generation unit has a piston and an elastic member, and the generation unit generates the high-pressure air by storing an elastic force of the elastic member by using the drive source and releasing the elastic force to move the piston at a high speed.

23. The foreign matter removal device according to claim 22, wherein the generation unit continuously generates the high-pressure air by repeatedly moving the piston at a high speed by using the drive source and the elastic member.

24. The foreign matter removal device according to claim 22, wherein a movement direction of the piston when generating the high-pressure air is parallel to the surface where the fixing member makes surface contact with the panel member.

25. A foreign matter removal device which removes foreign matters on a lens, the foreign matter removal device comprising:

a high-pressure air generation unit that includes a generation unit having a drive source and configured to generate high-pressure air using the drive source, and a housing covering the generation unit, a plate-shaped fixing member fixed to a panel member; and a connector that connects the fixing member and the high-pressure air generation unit and is capable of absorbing vibration, wherein a gap is formed between the fixing member and the housing in a state in which the fixing member is fixed to the panel member and the housing is connected to the connector.

26. A vehicle comprising the foreign matter removal device according to claim 15.

* * * * *